(12) United States Patent
Hutson et al.

(10) Patent No.: US 12,096,538 B2
(45) Date of Patent: *Sep. 17, 2024

(54) FAILURE MODELING AND MANAGEMENT OF AN AERIAL LIGHT FIXTURE

(71) Applicant: UBICQUIA, INC., Fort Lauderdale, FL (US)

(72) Inventors: Bradford Brian Hutson, Vero Beach, FL (US); Ronald B. Zimmerman, III, Wellington, FL (US); Ian B. Aaron, Fort Lauderdale, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/943,130

(22) Filed: Sep. 12, 2022

(65) Prior Publication Data

US 2023/0007760 A1    Jan. 5, 2023

Related U.S. Application Data

(63) Continuation of application No. 16/960,515, filed as application No. PCT/US2019/012776 on Jan. 8, 2019, now Pat. No. 11,445,593.

(Continued)

(51) Int. Cl.
*H05B 47/11* (2020.01)
*F21S 8/08* (2006.01)
(Continued)

(52) U.S. Cl.
CPC ............. *H05B 47/22* (2020.01); *F21S 8/085* (2013.01); *H04W 4/90* (2018.02); *H05B 41/40* (2013.01);
(Continued)

(58) Field of Classification Search
CPC ........ H05B 47/22; H05B 47/11; H05B 47/29; H05B 47/105; H05B 41/40; H04W 4/90; F21S 8/085; F21W 2131/103
See application file for complete search history.

(56) References Cited

U.S. PATENT DOCUMENTS 8,841,848 B2   9/2014   Ogata et al.
9,474,138 B2   10/2016  Denteneer et al.
(Continued)

FOREIGN PATENT DOCUMENTS

BR    102015003511 A2   2/2017
EP        3142464 A1    3/2017
(Continued)

OTHER PUBLICATIONS

PCT/US2019/012776—International Search Report and Written Opinion, dated Jul. 9, 2019 (18 pages).
(Continued)

*Primary Examiner* — Henry Luong
(74) *Attorney, Agent, or Firm* — Daniel C. Crilly

(57) ABSTRACT

A system to identify incidents associated with streetlight fixtures based on sensor data from one or more smart sensor devices. Each smart sensor device is coupled to a respective streetlight fixture and captures data from one or more sensors. The data from a single smart sensor device or a plurality of smart sensor devices is aggregated to generate a current data signature of the one or more smart sensor devices. The current data signature is compared to a plurality of known signatures to determine if an incident associated with a streetlight fixture has occurred. Such incidents can include a failed light source, a failing light source, a weather incident, a geologic incident, etc. Depending on the type of incident an instruction is sent to the one or more smart sensor devices to perform one or more responsive actions.

13 Claims, 10 Drawing Sheets

Related U.S. Application Data

(60) Provisional application No. 62/730,377, filed on Sep. 12, 2018, provisional application No. 62/614,918, filed on Jan. 8, 2018.

(51) Int. Cl.
| | | |
|---|---|---|
| *H04W 4/90* | (2018.01) | |
| *H05B 41/40* | (2006.01) | |
| *H05B 47/105* | (2020.01) | |
| *H05B 47/16* | (2020.01) | |
| *H05B 47/21* | (2020.01) | |
| *H05B 47/29* | (2020.01) | |
| *F21W 131/103* | (2006.01) | |

(52) U.S. Cl.
CPC ........... *H05B 47/105* (2020.01); *H05B 47/11* (2020.01); *H05B 47/29* (2020.01); *F21W 2131/103* (2013.01)

(56) References Cited

U.S. PATENT DOCUMENTS

| | | | |
|---|---|---|---|
| 9,699,873 | B2 | 7/2017 | Cumpston et al. |
| 9,756,710 | B2 | 9/2017 | Ghanoun et al. |
| 9,801,261 | B2 | 10/2017 | Lurie et al. |
| 11,445,593 | B2 | 9/2022 | Hutson et al. |
| 2009/0066258 | A1 | 3/2009 | Cleland et al. |
| 2012/0038490 | A1* | 2/2012 | Verfuerth ............... G08G 1/04 340/917 |
| 2013/0015783 | A1 | 1/2013 | Herbst |
| 2013/0221858 | A1* | 8/2013 | Silberstein ............ H05B 47/19 315/153 |
| 2013/0297212 | A1 | 11/2013 | Ramer et al. |
| 2015/0349399 | A1 | 12/2015 | Lasier et al. |
| 2020/0375016 | A1 | 11/2020 | Hutson et al. |

FOREIGN PATENT DOCUMENTS

| | | |
|---|---|---|
| EP | 2247165 A1 | 11/2020 |
| WO | 2012143814 A1 | 10/2012 |
| WO | 2013049584 A1 | 4/2013 |
| WO | 2014147510 A1 | 9/2014 |
| WO | 2014147524 A1 | 9/2014 |
| WO | 2016110487 A1 | 7/2016 |
| WO | 2017196166 A1 | 11/2017 |
| WO | 2017210791 A1 | 12/2017 |

OTHER PUBLICATIONS

European Patent Office, Notice of Opposition to a European Patent, dated Jul. 20, 2022, as filed in connection with European Patent No. EP3738403 resulting from parent application's counterpart European Patent Application No. EP19704903.4 (40 pages).

European Patent Office, Minutes of the Oral Proceedings Before the Opposition Division, dated Feb. 16, 2024, as issued in connection with European Patent No. EP3738403 (44 pages).

European Patent Office, Interlocutory Decision in Opposition Proceedings, dated Feb. 16, 2024, as issued in connection with European Patent No. EP3738403 (63 pages).

Ubicquia, Inc. Response to the Communications of a Notice of Opposition, dated Dec. 12, 2022, as filed in connection with European Patent No. EP3738403 (28 pages).

Ubicquia, Inc. Submission in Opposition Proceedings Made Following Summons to Attend Oral Proceedings, dated Nov. 24, 2023, as filed in connection with European Patent No. EP3738403 (79 pages).

* cited by examiner

FAILURE MODELING AND MANAGEMENT OF AN AERIAL LIGHT FIXTURE

CROSS-REFERENCE TO RELATED APPLICATIONS

The present application is a continuation of U.S. application Ser. No. 16/960,515, now U.S. Pat. No. 11,445,593, which was filed on Jul. 7, 2020, and is incorporated herein by this reference in its entirety. Application Ser. No. 16/960,515 is a national stage entry under 35 U.S.C. § 371(c) of International Application No. PCT/US2019/012776, which was filed on Jan. 8, 2019, and is incorporated herein by this reference in its entirety. International Application No. PCT/US2019/012776 claims priority under 35 U.S.C. § 119(e) upon, and the benefit of, U.S. Provisional Application No. 62/730,377, which was filed on Sep. 12, 2018, and is incorporated herein by reference in its entirety. International Application No. PCT/US2019/012776 also claims priority under 35 U.S.C. § 119(e) upon, and the benefit of, U.S. Provisional Application No. 62/614,918, which was filed on Jan. 8, 2018, and is incorporated herein by reference in its entirety.

TECHNICAL FIELD

The present disclosure generally relates to aerial lighting fixture monitoring. More particularly, but not exclusively, the present disclosure relates to computing devices that are mounted to aerial lighting fixtures that model and manage characteristics associated with the aerial lighting fixtures.

BACKGROUND

Aerial lighting fixtures are known to include conventional light controllers. These conventional light controllers may be electric devices, mechanical devices, or electromechanical devices. Generally, if the controller detects an amount of light that is determined to be insufficient, the controller will direct the light source in the aerial lighting fixture to illuminate. On the other hand, if the controller detects an amount of light that is determined to be sufficient, the controller will direct the light source in the aerial lighting fixture to extinguish.

In some instances, the controller may be more sophisticated and perform additional functionality beyond simply directing the light source to turn on or off. For example, the controller may track time of day when it instructed the light source to turn on or off, store an amount of time the light source was illuminated, or provide additional functionality. If, however, an event occurs that impacts one or more aerial lighting fixtures, then it such an event may go unnoticed or uncorrected. For example, if a hurricane topples numerous aerial lighting fixtures in an area, it may be difficult to determine which light poles are up and which ones have fallen over.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

A system may be summarized as including a plurality of smart sensor devices coupled to respective streetlight fixtures of a plurality of streetlight fixtures, wherein each smart sensor device includes: a memory arranged to store data; and a processor-based monitoring circuit arranged to receive data captured by one or more sensors and store the received data in the memory; and a computing device that includes: a memory arranged to store data received from the plurality of smart sensor devices; and a processor arranged to execute computer instructions that, when executed by the processor, cause the processor to: aggregate the stored data from the plurality of smart sensor devices; generate a current data signature from the aggregated data; compare the current data signature to a plurality of known signatures; identify an incident affecting at least one of the plurality of streetlight fixtures based on the comparison between the current data signature and the plurality of known signatures; and perform an action based on the identified incident.

The processor may be arranged to execute the computer instructions that, when executed by the processor, may further cause the processor to determine that the identified incident is a failed light source in one of the plurality of streetlight fixtures; identify a first smart sensor device of the plurality of smart sensor devices that is coupled to a first streetlight fixture of the plurality of streetlight fixtures that includes the failed light source; identify a second smart sensor device of the plurality of smart sensor devices that is coupled to a second streetlight fixture of the plurality of streetlight fixtures and is near the first smart sensor device; and instruct the second smart sensor device to increase an intensity of a working light source in the second streetlight fixture.

The processor may be arranged to execute the computer instructions that, when executed by the processor, may further cause the processor to determine that the identified incident is a failing light source in one of the plurality of streetlight fixtures; identify a first smart sensor device of the plurality of smart sensor devices that is coupled to a first streetlight fixture of the plurality of streetlight fixtures that includes the failing light source; identify a second smart sensor device of the plurality of smart sensor devices that is coupled to a second streetlight fixture of the plurality of streetlight fixtures and is near the first smart sensor device; instruct the first smart sensor device to reduce usage of the failing light source in the first streetlight fixture; and instruct the second smart sensor device to increase usage of a working light source in the second streetlight fixture.

The instruction of the first smart sensor device to reduce usage of the failing light source in the first streetlight fixture may include instructing the first smart sensor device to reduce an amount of time in which the failing light source is illuminated at night; and the instruction of the second smart sensor device to increase usage of the second light source in the second streetlight fixture may include instructing the second smart sensor device to increase an intensity of the working light source during a time when the failing light source is not illuminated at night. The instruction of the first smart sensor device to reduce the amount of time in which the failing light source is illuminated at night may include decreasing a threshold amount of light to be detected to illuminate the failing light source. The instruction of the first smart sensor device to reduce an amount of time in which the failing light source is illuminated at night may include delaying illumination of the failing light source. The instruction of the first smart sensor device to reduce usage of the failing light source in the first streetlight fixture may include instructing the first smart sensor device to decrease an intensity of the failing light source; and the instruction of the second smart sensor device to increase usage of the second light source in the second streetlight fixture may include instructing the second smart sensor device to increase an intensity of the working light source.

The processor may be arranged to execute the computer instructions that, when executed by the processor, may further cause the processor to determine that the identified incident is a weather incident affecting at least a subset of the plurality of streetlight fixtures; identify a first smart sensor device of the plurality of smart sensor devices that captures data associated with the weather incident during a first time period; identify a second smart sensor device of the plurality of smart sensor devices that captures data associated with the weather incident during a second time period that is after the first time period; and determine an estimated path of the weather incident based on a first location of the first smart sensor device relative to a second location of the second smart sensor device.

The processor may be arranged to execute the computer instructions that, when executed by the processor, may further cause the processor to provide the estimated path of the weather incident to a user.

The processor may be arranged to execute the computer instructions that, when executed by the processor, may further cause the processor to identify a third smart sensor device of the plurality of smart sensor devices in the estimated path of the weather incident; and instruct the third smart sensor device to output a warning regarding the weather incident. The weather incident may include a hurricane, a tornado, a flood, a monsoon, a cyclone, a blizzard, a hailstorm, a windstorm, or poor air quality.

The processor may be arranged to execute the computer instructions that, when executed by the processor, may further cause the processor to determine that the identified incident is a geologic incident affecting at least a subset of the plurality of streetlight fixtures; identify the subset of the plurality smart sensor devices that captured data associated with the geologic incident; determine a geographic location of each identified smart sensor device; generate geologic incident characteristics of the geologic incident based on the geographic location of the identified smart sensor devices and the captured data associated with the geologic incident; and provide the geologic incident characteristics to a user. The geologic incident may include an earthquake, volcanic activity, a lahar, or a landslide. The computing device may be one of the smart sensor devices.

The comparison of the current data signature to the plurality of known signatures may include comparing the current data signature of a target smart sensor device of the plurality of smart sensor devices to a light pole fatigue signature; generating an estimated failure time of a light pole coupled to the streetlight fixture that is coupled to the target smart sensor device; and providing the estimated failure time to a user.

A smart sensor device coupled to a first streetlight fixture that is coupled to a light pole may be summarized as including a memory arranged to store computing instructions and data; a sensor arranged to capture data; and a processor arranged to execute the computing instructions to: store the captured data from the sensor in the memory; aggregate the stored data over a period of time; generate a current data signature from the aggregated data; compare the current data signature to a plurality of known signatures, each known signature being associated with a known type of incident; identify an incident affecting the first streetlight fixture based on the comparison between the current data signature and the plurality of known signatures; and perform an action based on the identified incident.

The processor may be arranged to execute the computing instructions further to determine that a failure has occurred to a first light source in the first streetlight fixture; and send, to a second smart sensor device that is coupled to a second streetlight fixture near the first streetlight fixture, an instruction for the second smart sensor device to increase an intensity of a second light source in the second streetlight fixture.

The processor may be arranged to execute the computing instructions further to determine that a first light source in the first streetlight fixture is failing; and reduce an intensity of the first light source.

The processor may be arranged to execute the computing instructions further to determine a fatigue on the light pole based on the comparison between the current data signature and a known signature associated with light pole fatigue; and in response to the determined fatigue exceeding a threshold amount, providing a light-pole failure warning to a user.

A method may be summarized as including obtaining sensor data from one or more smart sensor devices that are coupled to one or more streetlight fixtures; aggregating the data to generate a current data signature; comparing the current data signature to a plurality of known signatures; identifying an incident affecting one or more streetlight fixtures based on the comparison between the current data signature and the plurality of known signatures; and perform an action based on the identified incident to modify usage of one or more streetlight fixtures.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Embodiments of the present disclosure include smart sensor devices that have a desired shape and electromechanical configuration for mounting to a roadside aerial lighting fixture (e.g., "streetlight fixture"). More particularly, each smart sensor device includes an interface connector that is compliant with a particular standard used by streetlight fixtures, such as a NEMA-style connector. The NEMA-style connector enables the smart sensor device to be electromechanically coupled to the streetlight fixture, generally on the top of the streetlight fixture. In this way, the smart sensor device is attached to or otherwise integrated into the streetlight fixture and can pass information between the smart sensor device and the streetlight fixture. The information may include any one or more of high speed data, low speed data, power, digital signals, analog signals, differential signals, or other types of information. In various embodiments, smart sensor devices may include or be referred to as aerial control fixtures, small cell networking devices, streetlight-fixture controller, aerial smart sensor devices, or the like.

The present disclosure may be understood more readily by reference to this detailed description of the invention. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the embodiments.

Figure 1:
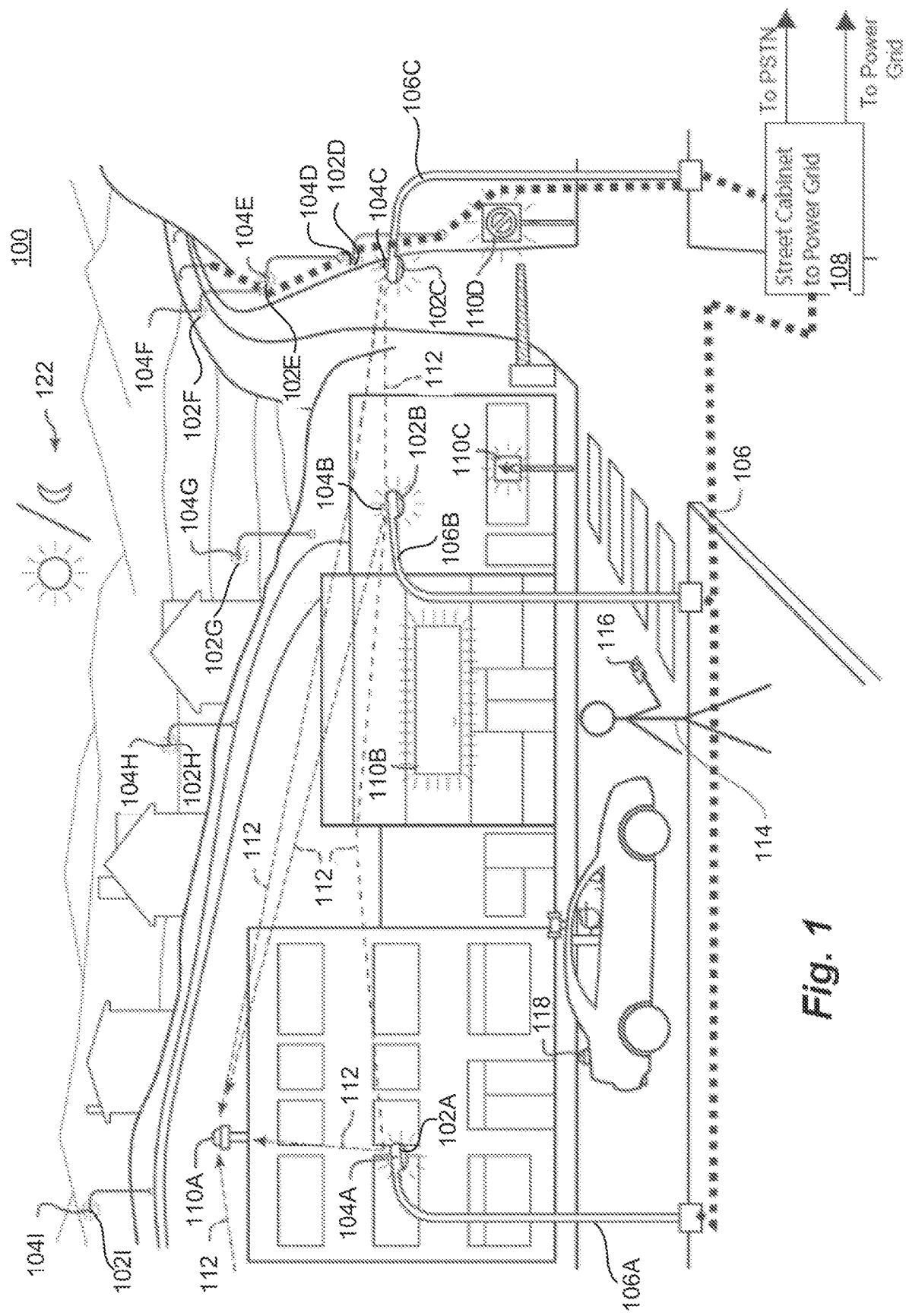
FIG. 1 is a system level deployment of smart sensor devices coupled to streetlight fixtures.

FIG. 1 is a system level deployment 200 of smart sensor devices 104A-104I coupled to streetlight fixtures 102A-102I. The streetlight fixtures 102A-102I are coupled to or otherwise arranged as part of a system of streetlight poles, and each streetlight fixture includes a light source. Each light source, light fixture, and light fitting, individually or along with their related components, may in some cases be interchangeably referred to as a luminaire, a light source, a streetlight, a streetlamp, or some other such suitable term. Those of ordinary skill in the art will understand that a smart sensor device 104 as described herein does not need to be directly coupled to a streetlight fixture 102 and instead such smart sensor device 104 can be coupled to buildings, towers, masts, signage, or any other structure. Nevertheless, for simplicity in the description, smart sensor devices 104A-104I described herein are coupled to streetlight fixtures 102A-102I.

Briefly, each smart sensor device 104 monitors and collects data from one or more sensors or on conditions associated with the corresponding streetlight fixture 102. The smart sensor devices 104 may periodically monitor sensors, such as record the tilt of the light pole every one second, or they may be triggered to monitor a sensor. For example, a smart sensor device 104 may be triggered to capture data from one sensor based on other sensor data, such as record the light pole tilt in response to a threshold vibration value being captured by an accelerometer of the smart sensor device. Examples of captured data include, but are not limited to light pole tilt, external vibrations, light source temperature, external temperature, power usage or consumption, images, sound recordings, network traffic, network throughput, cellular signal strength, or other information that can be obtained or recorded by the smart sensor device 104.

In general, each smart sensor device 104A-104I captures sensor data and provides it to another smart sensor device 104, a remote server (not illustrated), or some other computing device 110. The computing device that receives the data, whether from a single smart sensor device 104 or a plurality of smart sensor devices 104A-104I processes the data to determine if an incident has or is occurring and to take action based on that incident. For example, a current data signature is generated from an aggregation of the received data. The current data signature is compared to a plurality of known signatures of known incidents to identify a currently occurring incident with the streetlight fixtures 102A-102A. Depending on the identified incident, one or more smart sensor devices 104A-104I are instructed to take an action. In this way, the smart sensor devices 104A-104I provide streetlight fixture modeling and management. The following are a few sample scenarios in which such modeling and management may be performed.

In a first example, the monitored data from smart sensor device 104B may indicate that the light source of the streetlight fixture 102B has failed. The system can instruct smart sensor devices 104A and 104C control or direct streetlight fixtures 102A and 102C, respectively to increase the light intensity output by their light sources. This increased illumination provided by streetlight fixtures 102A and 102C can help compensate for the failed light source of streetlight fixture 102B as experienced by user 114.

In a second example, the monitored data from smart sensor device 104E may indicate that the light source of the streetlight fixture 102E is failing or otherwise has a diminished operating life. The smart sensor device 104E can be instructed to modify how it directs the streetlight fixture 102E to turn on or off the light source or its intensity, which can extend the operating life of the light source. Likewise, smart sensor devices 104D and 104F can also be instructed to modify their control or direction streetlight fixtures 102D and 102F, respectively, to help compensate for diminished usage of the failing light source of streetlight fixture 104E.

In a third example, the monitored data from smart sensor devices 104H and 104I may indicate that a weather incident is occurring, such as a hurricane or tornado. Smart sensor devices 104H and 104I, or even smart sensor devices 104A-104G can be instructed to output alerts or to collect additional data related to the weather incident.

In a fourth example, the monitored data from smart sensor devices 104H and 104I may indicate that a geologic incident is occurring, such as a landslide. Smart sensor devices 104G, 104E, and 104D can be instructed to output alerts regarding the landslide. Additionally, data on the geologic incident may be provided to user 114 via mobile device 116, or some other computing device.

In a fifth example, smart sensor device 104A may be equipped with a microphone and processing functionality to detect a gunshot. Based on the known location of the smart sensor device 104A and the time at which the gunshot was recorded, an approximate location of the origin of the gunshot may be determined. In response, the smart sensor device 104A, or the smart sensor device 104B may be instructed to capture additional camera images in an attempt to locate and identify the shooter or any possible victims.

In a sixth example, the smart sensor device 104F and 104C may utilize air quality sensors to detect air-quality conditions (e.g., wildland fire smoke, smog, or other pollutants). By tracking these data across a plurality of smart sensor devices, the smart sensor devices may identify an origin of pollutants, the movement of pollutants, the distribution of pollutants, etc. This information can then be used to inform or warn the public of hazardous area or identify and fix the cause of the pollutants.

In a seventh example, the smart sensor device 104B may utilize tilt or vibration data to determine if the light pole 106B has failed or is fatigued and may soon fail. The system can then take action by scheduling or initiating a technician to inspect the light pole 106B and replace it if needed.

These examples are not to be construed as limiting or exhaustive and other actions may be performed based on the type of incident identified from the monitored data.

As shown in the system level deployment 200, a plurality of light poles 106 are arranged in one or more determined geographic areas, such as a city or town, neighborhood, street, county, municipality, city block, etc. Each light pole 106 has at least one streetlight fixture 102 affixed thereto. For example, streetlight fixture 102A is coupled to light pole 106A, streetlight fixture 102B is coupled to light pole 106B, streetlight fixture 102C is coupled to light pole 106C, and so on. In most cases, the streetlight fixture 102 is at least twenty feet above ground level and in at least some cases, the streetlight fixtures 102A-102I are between about 20 feet and 40 feet above ground level. In other cases, the streetlight fixtures 102 may of course be lower than 20 feet above the ground or higher than 40 feet above the ground. Although described as being above the ground, streetlight fixtures 102A-102I may also be subterranean, but positioned above the floor, such as in a tunnel.

The system of streetlight poles, streetlight fixtures, streetlight sources, or the like in the system level deployment may be controlled by a municipality or other government agency. In other cases, the system streetlight poles, streetlight fixtures, streetlight sources, or the like in the system level deployment is controlled by a private entity (e.g., private property owner, third-party service contractor, or the like). In still other cases, a plurality of entities may share control of the system of streetlight poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of streetlight poles, streetlight fixtures, streetlight sources, or the like can be granted some control such as in a neighborhood, around a hospital or fire department, in a construction area, or in some other manner.

In the system level deployment 200 of FIG. 1, any number of streetlight fixtures 102 may be arranged with a smart sensor device 104. In various embodiments, each smart sensor device 104 includes at least one connector portion that is compliant with a roadway area lighting standard promoted by a standards body, such as a multi-pin NEMA connector that is compliant with an ANSI C136.41, which allows for uniform connectivity to the streetlight fixture 102. The controlling or servicing authority of the system can install the smart sensor devices 104A-104I on each streetlight fixture 102A-102I, or the smart sensor device 104 may be built into or embedded in each streetlight fixture 102. The use of smart sensor devices 104A-104I allows for the controlling or servicing authority to control the streetlight fixtures 102A-102I, collect information on the streetlight fixtures 102A-102I, or provide other wireless services to the public.

In the system level deployment 200, a smart sensor device 104 is electromechanically coupled to a selected light pole wherein the electromechanical coupling is performed via the connector that is compliant with the roadway area lighting standard promoted by a standards body. In the illustrated example, smart sensor devices 104A-104I are coupled to streetlight fixtures 102A-102I, respectively. In this way, each separate smart sensor device 104A-104I controls or monitors a respective streetlight fixture 102A-102I In some embodiments, the smart sensor device 104 includes a processor-based light control circuit and a light sensor such that it provides a light control signal to the light source of the respective streetlight fixture 102 based on at least one ambient light signal generated by its associated the light sensor.

In other embodiments, each smart sensor device 104A-104I may be equipped with communication capabilities, which allows for the remote control of light source of the streetlight fixture 102A-102I. Accordingly, each light source in each streetlight fixture 102A-102I can be controlled remotely as an independent light source or in combination with other light sources, which also for the wireless communication of light control signals and any other information (e.g., packetized data) between smart sensor devices 104A-104I.

This communication capability may also be used for additional communications between smart sensor devices 104A-104I, other computing devices 110A-110D, or a remote server (not illustrated). Accordingly, each of the plurality of streetlight fixtures 102A-102I that has a corresponding smart sensor device 104 may be communicatively coupled to one another and to other computing devices. Each smart sensor device 104 may be in direct or indirect wireless communication with one another, such as via wireless communication links 112.

In some embodiments, the smart sensor devices 104A-104I may communicate with a remote server (not illustrated), which is discussed in more detail below in conjunction with FIG. 3. In other embodiments, one or more of the smart sensor devices 104A-104I may communicate with other computing devices 110A-110D. The other computing devices 110A-110D may be controlled by a mobile network operator (MNO), a municipality, another government agency, a third party, or some other entity. In at least one embodiment, one or more of the other computing devices 110A-110D be internet of things (IoT) devices or some other types of devices. For example, in this illustration, two public information signs 110B, 110C, and a private entity sign 110D are shown, but many other types of devices are contemplated. Each one of these devices may form an unlicensed wireless communication session (e.g., Wi-Fi) or a cellular-based wireless communication session with one or more wireless networks made available by the smart sensor devices 104A-104I in the system level deployment 100 of FIG. 1.

As one non-limiting, non-exhaustive example, each smart sensor device 104 may operate a small cell networking device to provide wireless cellular-based network communication services. It is generally known that a "small cell" is a term of art in the cellular-based industry. A mobile device, e.g., mobile device 116, provisioned by the MNO communicates with a small cell in the same or similar manner that the mobile device communicates with a macrocell tower. In at least some cases, an active communication session formed between a small cell and a mobile device may be handed off to or from a small cell as the mobile device moves into or out from the active range of the small cell. For example, a user having an active communication session enabled by a small cell may be in motion, and when the mobile device is in motion, the active communication session may in some cases be automatically and seamlessly handed off and continue via another small cell or via a macrocell tower.

As is known, many different types of small cells are deployed by MNOs to serve particular geographic areas within a larger macrocell. Some of the different types are microcells, metrocells, picocells, and femtocells. Microcells generally cover an area having diameter less than about one mile and operate with a radiated power of about five watts (5 W) to ten watts (10 W). Metrocells generally cover an area having a diameter of less than about a half mile and operate with a radiated power of about 5 W or less. Metrocells can provide wireless cellular-based service for up to about 200 concurrent mobile devices. Picocells generally cover an area having a diameter less than about 500 feet and operate with a radiated power of about 100 milliwatts (mW) to 5 W; providing cellular-based wireless service for up to about 5 dozen concurrent mobile devices. Femtocells generally cover areas having a diameter less than about 30 feet and operate with a radiated power of about 10 mW to 1000 mW to provide cellular-based service for up to just a few mobile devices.

Small cells are usually owned and installed and maintained by the MNO on whose network they will operate on. Even in cases of femtocells, which may be installed by non-MNO entity, the femtocells are deployed and provisioned by the MNO for operation on the MNO's wireless cellular-based network. This provisioning is necessary in a small cell because the small cell operates in the MNO's licensed frequency spectrum. In addition to having front end with a cellular-based interface, the small cell has a back end that provides backhaul services for the device. Small cell backhaul is the transmission link between the small cell and the MNO's core network. In some small cells, backhaul services are provided across conventional broadband internet services such as digital subscriber line (DSL), cable, a T1 line, or some other wide area network access point.

In the system level deployment 100 of FIG. 1, various ones of the light poles 106 may be 50 feet apart, 100 feet apart, 250 feet apart, or some other distance. In some cases, the type and performance characteristics of each smart sensor device 104 are selected based on their respective distance to other such devices such that wireless communications are acceptable.

Smart sensor devices 104A-104I may be coupled to a street cabinet 108 or other like structure that provides utility power (e.g., "the power grid") in a wired way via the coupled streetlight fixture 102 and light pole 106. The utility power may provide 120 VAC, 240 VAC, 260 VAC, or some other power source voltage, which is used to power both the light source of the streetlight fixture 102 and the coupled smart sensor device 104. In addition, smart sensor devices 104A-104I may also be coupled to the same street cabinet 108 or another structure via a wired backhaul connection via the coupled streetlight fixture 102 and light pole 106. It is understood that these wired connections are in some cases separate wired connections (e.g., copper wire, fiber optic cable, industrial Ethernet cable, or the like) and in some cases combined wired connections (e.g., power over Ethernet (PoE), powerline communications, or the like). For simplification of the system level deployment 100 of FIG. 1, the wired backhaul and power line 106 is illustrated as a single line. The street cabinet 108 is coupled to the power grid, which is administered by a licensed power utility agency, and the street cabinet 108 is coupled to the public switched telephone network (PSTN).

As mentioned above, a smart sensor device 104 may operate as a small cell networking device. A user 114 holding a mobile device 116 is represented in the system level deployment 100 of FIG. 1. A vehicle having an in-vehicle mobile device 118 is also represented. The vehicle may be an emergency service vehicle, a passenger vehicle, a commercial vehicle, a public transportation vehicle, a drone, or some other type of vehicle. The user 114 may use their mobile device 116 to establish a wireless communication session over a cellular-based network controlled by an MNO, wherein packetized wireless data is passed through the smart sensor device 104 to the MNO via cellular macrocell tower. Concurrently, the in-vehicle mobile device 118 may also establish a wireless communication session over the same or a different cellular-based network controlled by the same or a different MNO, wherein packetized wireless data of the second session is also passed through the smart sensor device 104 to the MNO via cellular macrocell tower.

The sun and moon 122 are shown in FIG. 1. Light or the absence of light based on time of day, weather, geography, or other causes provide information (e.g., ambient light) to the light sensors of the smart sensor device 104. Based on this information, the smart sensor device 104 provides control instructions or signals to the associated streetlight fixture, which controls its corresponding light source.

Although FIG. 1 illustrates smart sensor devices 104A-104I, more or fewer smart sensor devices may be employed in embodiments described herein. For example, a smart sensor device 104 can be installed on every streetlight fixture 102 on a street or in a neighborhood, city, county, or other geographical boundary. As a result, embodiments described herein may be employed for one smart sensor device, five smart sensor devices, 100 smart sensor devices, 10,000 smart sensor devices, or some other number of smart sensor devices. Moreover, smart sensor devices 104 may be installed on each streetlight fixture 102 in a geographical boundary or they may be installed on every other or every third streetlight fixture 102. Thus, the distribution of smart sensor devices 104 throughout a street, neighborhood, or city can take on virtually any distribution and may differ from one street, neighborhood, or city to the next.

Figure 2:
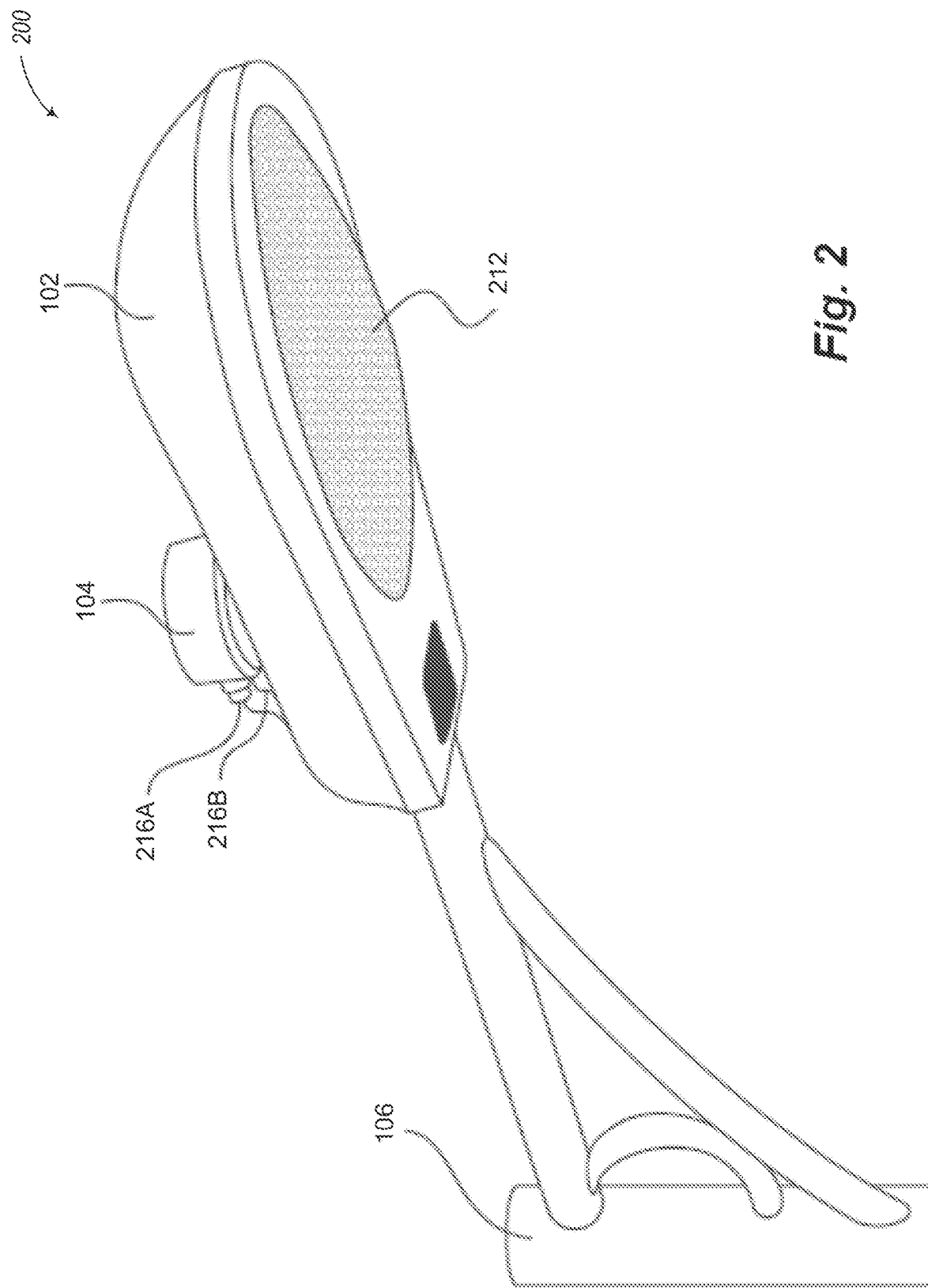
FIG. 2 is streetlight that includes smart sensor device that is coupled to a streetlight fixture, which itself is coupled to a light pole.

FIG. 2 is streetlight 200 that includes a smart sensor device 104 that is coupled to a streetlight fixture 102, which itself is coupled to a light pole 106. The streetlight fixture 102 includes a light source 212. The light source 212 may be an incandescent light source, a light emitting diode (LED) light source, a high pressure sodium lamp, or any other type of light source. In the streetlight 200 of FIG. 2, the smart sensor device 104 is coupled to the streetlight fixture 102 via a multi-pin NEMA connector. That is, the pins of the multi-pin NEMA connector are electromechanically coupled to a compatible NEMA socket integrated into the light fixture 102. In some cases, the smart sensor device 104 replaces or otherwise takes the place of a different light sensor device, which does not have the features provided by the smart sensor device 104. In this illustration, cables 116A, 116B are coupled to the smart sensor device 104 to provide additional functionality to the smart sensor device 104. For example, the cables 116A, 116B may be arranged to couple to the smart sensor device 104 to other devices or sensors (not illustrated) (e.g., cameras, transducers, weather devices, internet of things (IoT) devices, or any other type of device). Accordingly, the cables 116A, 116B are arranged to pass sensor signals, internet of things (IoT) signals, multimedia signals (e.g., cameras or other multimedia devices), weather signals, transducer signals, control signals, or any other type of power and/or signaling data to the smart sensor device 104.

Figure 3:
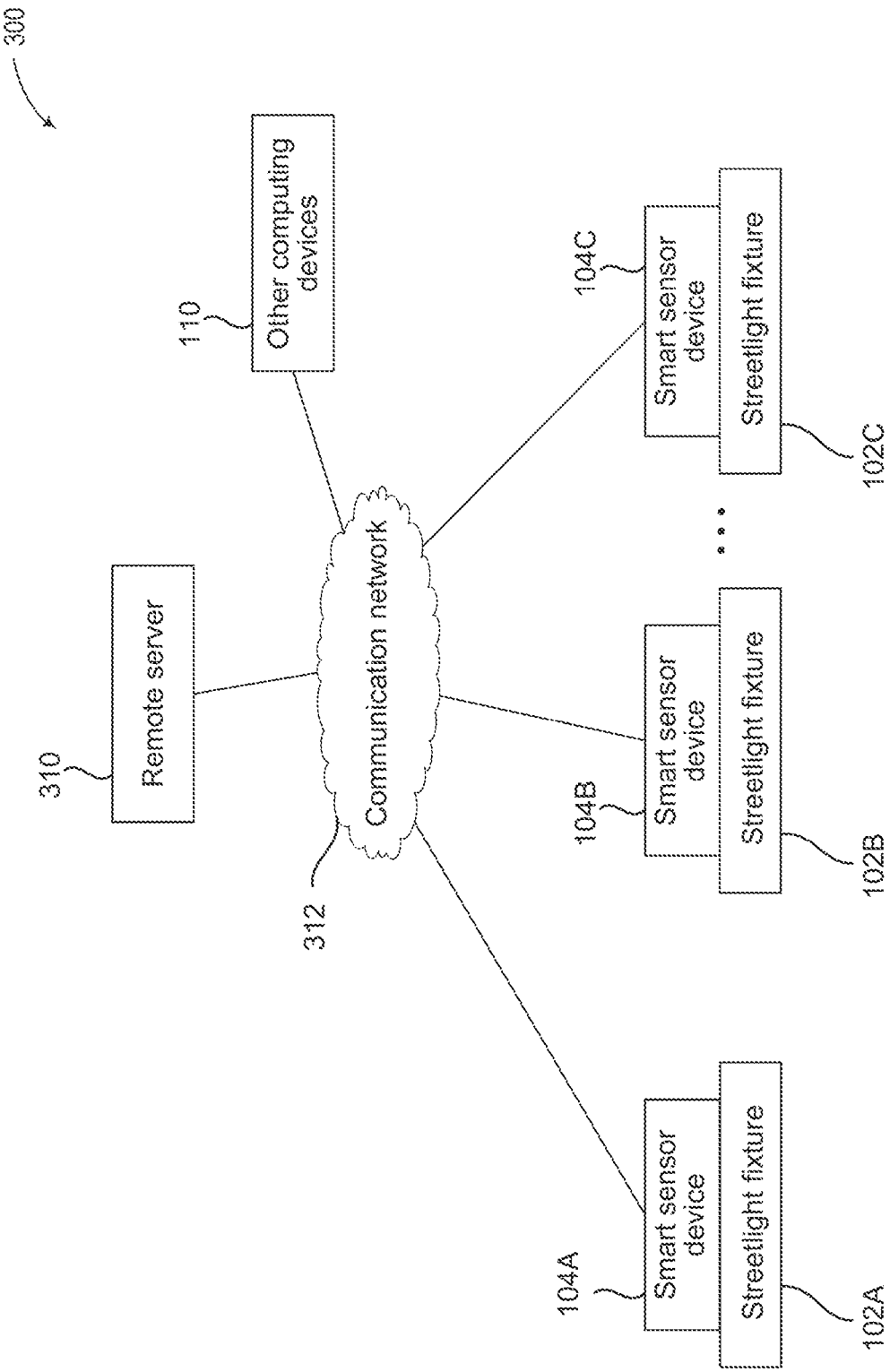
FIG. 3 is a block diagram of a communication environment between smart sensor devices and a remote server.

FIG. 3 is a block diagram of a communication environment 300 between smart sensor devices 104A-104C and a remote server 310. As described herein, smart sensor devices 104A-104C are coupled to streetlight fixtures 102A-102C, respectively. Each smart sensor device 104A-104C communicates with each other, with other computing devices 110, or remote server 310 via a communication network 312. The communication network 213 includes one or more wired or wireless networks that are configured to communicatively couple various computing devices to transmit content/data from one or more devices to one or more other devices. For example, communication network 312 may include, but is not limited to, Ethernet, Power over Ethernet, powerline communications (PLC), the Internet, cellular networks, short-range wireless networks, X.25 networks, a series of smaller private connected networks that carry the information, or some combination thereof.

As described herein, smart sensor devices 104A-104C monitor one or more sensors or conditions associated with the corresponding streetlight fixture 102A-102C to collect various types of data. In various embodiments, the remote server 310 may send a selection to each smart sensor device 104A-104C identifying what sensor data each is to collect. In some embodiments, the data collected by a plurality of smart sensor devices 104A-104C may be the same. In other embodiments, one or more smart sensor devices may be instructed to collect different data from one or more other smart sensor devices.

In various embodiments, the smart sensor devices 104A-104C provide the collected data to the remote server 310 for processing. The remote server 310 aggregates the data and generates a current data signature for the data. The current data signature is a representation of some aspect of one or more streetlight fixtures 102A-102C or of something affecting the one or more streetlight fixtures 102A-102C.

The current data signature is compared to a plurality of known incident signatures to identify an incident associated with the collected data. The known incident signatures are patterns, representations, thresholds, or the like that can indicate an occurrence of an incident. As described herein, incidents can be weather incidents, geologic incidents, streetlight fixture specific incidents, light pole specific incidents, or the like, or some combination thereof.

In response to an incident being identified, the remote server 310 performs one or more actions, such as instructing one or more of the smart sensor devices 104A-104C to modify the usage of the light source of the correspondingly coupled streetlight fixtures 102A-102I, output an alert or warning (e.g., via the correspondingly coupled light source or some other output device), or collect additional data. The remote server 310 may also provide information regarding the identified incident to a user (not illustrated). In this way, the system provides various different types of modeling and management of streetlight fixtures 102A-102C.

Although FIG. 3 describes the remote server 310 as performing the data analysis and resulting actions, embodiments are not so limited. In other embodiments, the collected data may be provided to one or more of the smart sensor devices 104A-104C or to some other computing device 110 for processing. Moreover, embodiments described herein enable administrators, users, maintenance workers, municipalities, researchers, and others to monitor maintenance-related issues as well as environmental issues. Maintenance-related issues may include, but are not limited to, failed or failing light sources, failed or failing light poles, failed or failing mounting hardware, changes in voltage or current over time for a particular light source or for light sources in a particular geographic area (e.g., on one street, which could indicate a transformer problem), or other types of problems associated with the light sources, light poles, or associated electrical grid. Environmental issues may include, but are not limited to, earthquakes, hurricanes, tornados, windstorms, earth mounding, or other environmental issues.

Non-limiting and exemplary operation of certain aspects of the disclosure will now be described with respect to FIGS. 4A-4F. In at least one of various embodiments, processes 400A-400F described in conjunction with FIGS. 4A-4F, respectively, may be implemented by or executed on one or more computing devices, such as smart sensor device 104 in FIG. 1, remote server computer 310 in FIG. 3, or some other computing device, or some combination thereof.

Accordingly, in some embodiment, a smart sensor device 104 may perform embodiments described herein for data it collects itself. For example, the smart sensor device 104 monitors its associated sensors, collects data, and determines if an incident is occurring that affects the streetlight fixture to which that smart sensor device 104 is coupled. In other embodiments, a smart sensor device 104 may perform embodiments described herein for data collected by other smart sensor devices. In this way, one or more smart sensor devices collect sensor data, but another smart sensor device determines if an incident is occurring that affects the streetlight fixture to which the smart sensor devices that collected the data are coupled. In yet other embodiments, a remote server computer 310, or some other computing device, may perform embodiments described herein for data collected by one or more smart sensor devices 104. Therefore, one or more smart sensor devices collect sensor data, but a remote server computer determines if an incident is occurring that affects the streetlight fixture to which the smart sensor devices that collected the data are coupled.

Figure 4A:
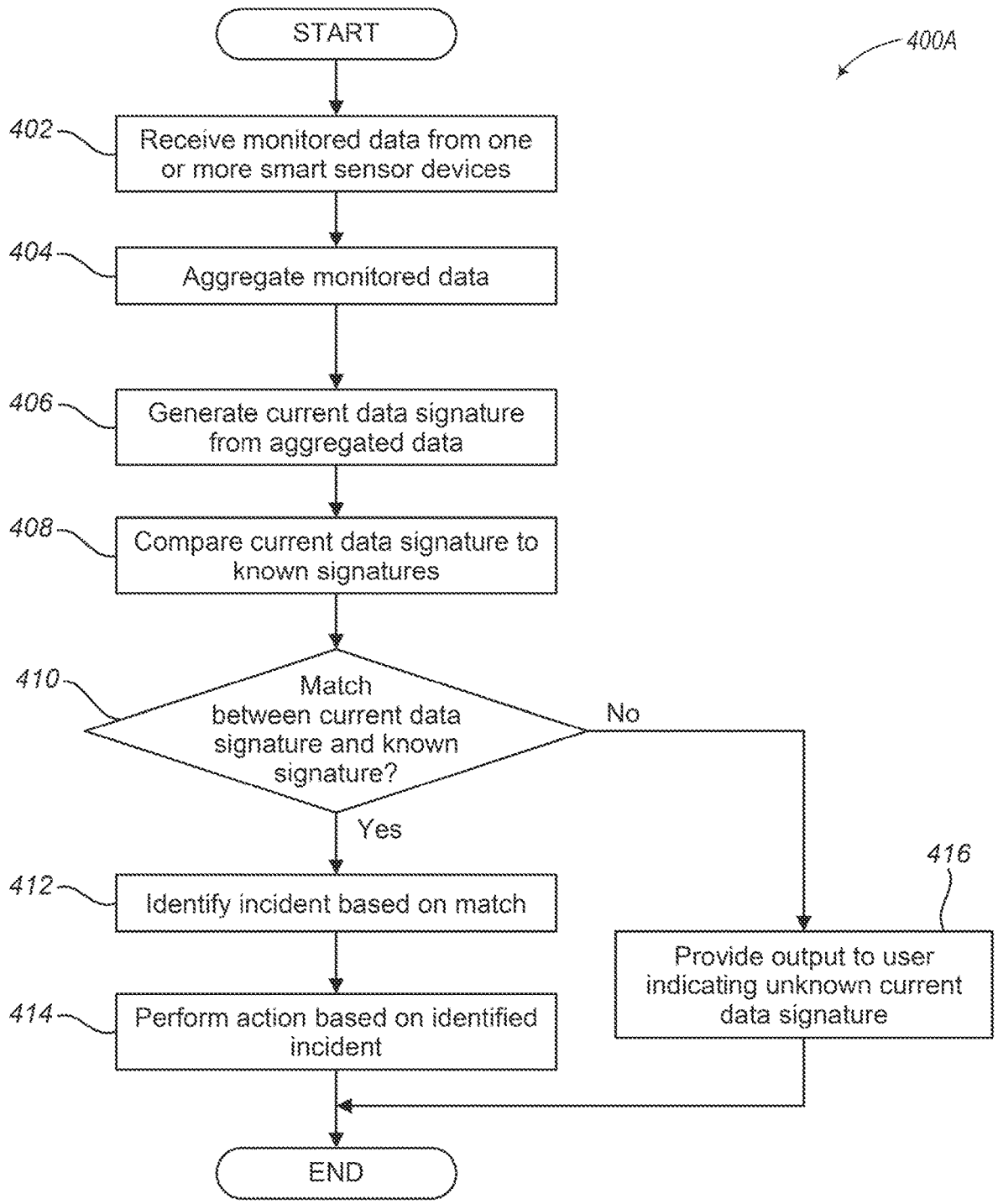
FIGS. 4A-4F are logical flow diagrams generally showing embodiments of a process for modeling and managing streetlight fixtures.

FIGS. 4A-4F are logical flow diagrams generally showing embodiments of a process for modeling and managing streetlight fixtures. FIG. 4A is a logical flow diagram generally showing an embodiment of an overview process 400A for aggregating data from multiple smart sensor devices 104A-104I and determining if the aggregated data matches known signatures of data.

Process 400A begins after a start block. At block 402, monitored data from one or more smart sensor devices 104 is received. As mentioned above, the data may be received by a smart sensor device that is collecting the data, another smart sensor devices that is not collecting data, a remote server computer, or some other computer. The smart sensor devices can report their collected data at selected times, at selected time intervals, when a threshold amount of data is collected, upon request, etc.

In various embodiments, the smart sensor devices collect the data by monitoring one or more sensors or conditions associated with the smart sensor device, the streetlight fixture to which the smart sensor device is coupled, or an environment surrounding the streetlight fixture. In at least one embodiment, the smart sensor devices receive instructions, such as from remote server computer 310, that indicate what sensors are to be monitored and what data is to be collected.

Examples of the collected data include, but are not limited to, tilt sensor data, accelerometer data, temperature data, power metering data, camera images or video, sound data, humidity sensor data, rain collection data, wind collection data, air quality data, or other data that can monitored about the smart sensor device itself, the streetlight fixture to which the smart sensor device is couple, the light pole that the corresponding streetlight fixture is coupled, or the environment surrounding the smart sensor device and the corresponding streetlight fixture and light pole.

In other embodiments, the collected data may include other data associated with the smart sensor device. For example, as discussed above, the smart sensor devices may operate as small cell networking devices to provide wireless cellular-based network communication services in some embodiments. The smart sensor devices may collect data associated with this communication service, including, but not limited to, signal strength, signal quality, data throughput, number of active users of the wireless network, etc. This wireless-network communication data may be utilized to track the overall status and quality of the network.

Process 400A proceeds to block 404, where the monitored data is aggregated. This aggregation can be for a single sensor, a single type of data, data from a plurality of sensors, a plurality of types of data, data from a single smart sensor device, data from plurality of smart sensor devices, etc. In some embodiments, aggregation of the monitored data includes correlating the data to a same distributed clock. In this way, the data can be analyzed and compared based on the time it was captured and the location of where it was captured (i.e., the location of the smart sensor device that captured the data). In various embodiments, the aggregation also combines the data into one or more time periods as selected by a user.

Process 400A continues at block 406, where a current data signature of the monitored data is generated from the aggregated data. Depending on how the data is aggregated, the current data signature may be for a single sensor, a single data type, multiple sensors, multiple data types, a single smart sensor device, or multiple smart sensor devices.

The current data signature provides metrics, information, illustrations, or other representations of the sensor data. In some embodiments, the current data signature indicates how sensor values changed over time. For example, a smart sensor device can monitor a tilt sensor and collect tilt angle data. The current data signature that is generated for this data may be a graph of the tilt angle over time, which can provide an estimate of how the respective tilt angle of the light pole coupled to the smart sensor device changes over time.

In other embodiments, the current data signature indicates a relationship between two or more sensor values. For example, a smart sensor device may capture light source temperature data and streetlight fixture power consumption data. The current data signature that is generated for this data may be the relationship between the light source temperature and the power consumption by the light source, which can provide an estimate of the efficiency of the light source.

As mentioned above, the current data signature may be generated for a plurality of smart sensor devices. This current data signature may include information for each separate smart sensor device (e.g., vibration data for each sensor over time) or it may be some combination of the data (e.g., an average power consumption over time). It should be noted that the plurality of smart sensor devices may be the smart sensor devices coupled to streetlight fixtures on a given street, on a particular block, along a particular stretch of highway, in a city or town, in a particular radius or area, etc. In this way, data from smart sensor devices can be analyzed at a lower granularity, such as at the city level, or at a higher granularity, such as at the street or block level.

It should be recognized that virtually any combination of sensor data and data metrics may be used to generate the current data signature for data from one or more smart sensor devices.

Process 400A proceeds next to block 408, where the current data signature is compared to a plurality of known signatures. The know signatures are patterns, thresholds, trends, tendencies, values, or other models or collections of information that are representative of a particular type of incident. The plurality of known signatures may be generated by an administrator, a manufacturer (e.g., the manufacturer or the light pole or the manufacturer of the streetlight fixture), based on historical data and failures, etc. Examples of the known signatures may include, but are not limited to, failed light source signatures, failing light source signatures, weather incident signatures, geologic incident signature, fatigued or failed light pole signatures, fatigued or failed streetlight fixture signatures, etc.

As one non-exhaustive example, a failing light source signature may be a steady decline in power consumption by the light source (or the streetlight fixture) over time. When the current data signature is compared to the failing light source signature, a match between the current data signature and the known failing light source signature may occur if the monitored data also shows a steady decline in power consumption. Therefore, the system can take action as if the light source in the streetlight fixture coupled to the smart sensor device that capture the data is failing.

Similarly, a failed light source signature may be a power consumption threshold that is set based on an amount of power expected to be consumed by the light source when illuminated. When the current data signature is compared to the failed light source signature, a match between the current data signature and the known failed light source signature may occur if the monitored data indicates that the power consumption is below the power consumption threshold. Therefore, the system can take action as if the light source in the streetlight fixture coupled to the smart sensor device that capture the data has failed.

In another example, a fatigued light pole signature may be a collection of vibration or tilt sensor values over a selected time period. The vibration and tilt of the light pole can provide an indication of when the light pole might break, fall down, or otherwise fail. Thus, a match between the current data signature and the known fatigued light pole signature may occur if the monitored data shows similar amounts of vibration or tilt over time to the vibration and tilt values in the fatigued light pole signature.

Likewise, a failed light pole signature may be a tilt sensor value over a selected threshold, such as over 20 degrees from horizontal. This type of tilt value may indicate that something has happened to the light pole, and it is now bent over or on the ground. Thus, a match between the current data signature and the known failed light pole signature may occur if the monitored data shows a tilt angle over the selected threshold in the failed light pole signature. One example implementation of tilt angle data is further described in conjunction with FIG. 4F.

In yet another example, an earthquake signature may be a selected pattern of vibrations that are detected by a plurality of smart sensor devices within a geographic area.

Similarly, a hurricane signature may be a plurality of sensors within a geographic area capturing similar tilt angles during a same time period. In still another example, an earth-mounding signature may be a selected pattern of changes in elevation of a smart sensor device. For example, if one or more smart sensor devices indicate that their elevation has increased 2 cm over a one month period of time, then the ground beneath the associated light poles may be moving in an upward direction (i.e., mounding).

It should be noted that these exemplary known signatures are not to be construed as limiting or exhaustive. Rather, other types of known signatures may be generated and utilized for different types of incidents. As discussed above, the current data signature can be generated based on data from a single smart sensor device or from data from a plurality of smart sensor devices, or from a single sensor or from multiple sensors. Thus, the known signatures may also be directed towards data from one or more sensor or one or more smart sensor devices. Moreover, sensor data may be collected and analyzed for a particular street, neighborhood, city, county, house, block, or other geographical area.

Process 400A continues next at decision block 410, where a determination is made whether there is a match between the current data signature and one or more known signatures. As indicated above, a match may be a simple as a single data value surpassing a threshold, or a match may be as elaborate as a specific pattern of sensor data values from a plurality of smart sensor devices. Thus, a match may be an exact match of data values, a value that surpasses a threshold, one or more data values within a given range or within some tolerance percentage from a threshold, a combination of data values, or some other selected trigger of when a match occurs between the current data signature and a known signature. If there is a match, process 400A flows to block 412; otherwise, process 400A flows to block 416.

At block 412, an incident is identified based on the match between the current data signature and a known signature. In various embodiments, the identified incident is an incident associated with the known signature that matched the current data signature. In some embodiments, the identified incident is one that is affecting one or more streetlight fixtures coupled to the smart sensor devices. In other embodiments, the identified incident may be one that is affecting or occurring in an area surrounding the smart sensor devices.

Process 400A proceeds next to block 414, where an action is performed based on the identified incident. These actions can include instructing a smart sensor device to perform an action or collect additional data, outputting a value or information to a user, or initiating a response to address an issue associated with the identified incident. Examples of such actions are further described below in conjunction with FIG. 4B-4E. Briefly, however, the following discussion includes few examples of the types of actions that may be performed.

In a first example, the monitored data from a smart sensor device 104 may indicate that the light source of the streetlight fixture 102 to which the smart sensor device 104 is coupled has failed. Nearby smart sensor devices (e.g., smart sensor devices that are mounted on streetlight fixtures adjacent to streetlight fixture 102, smart sensor devices that are mounted on streetlight fixtures within a line of sight of streetlight fixture 102, or some other smart sensor device or streetlight that is similarly "near" the failed or failing device) can then be instructed to control or direct their corresponding streetlight fixtures to increase the light intensity output by their light sources, which can help compensate for the failed light source. This example is further illustrated and discussed below in conjunction with process 400B in FIG. 4B.

In a second example, the monitored data from a smart sensor device 104 may indicate that the light source of the streetlight fixture 102 to which the smart sensor device 104 is coupled is failing or otherwise has a diminished operating life. That smart sensor device 104 can be instructed to modify how it directs the streetlight fixture 102 to turn on or off the light source or its intensity, which can extend the operating life of the light source. Likewise, nearby smart sensor devices can also be instructed to modify their control or direction of their corresponding streetlight fixtures to help compensate for a diminished usage of the failing light source. This example is further illustrated and discussed below in conjunction with process 400C in FIG. 4C.

In a third example, the monitored data from multiple smart sensor devices 104A-104I may indicate that a weather incident is occurring. Various actions can then be performed to provide alerts or collect additional data related to the weather incident. This example is further illustrated and discussed below in conjunction with process 400C in FIG. 4C.

In a fourth example, the monitored data from multiple smart sensor devices 104A-104I may indicate that a geologic incident is occurring. Various actions can then be performed to provide alerts or collect additional data related to the geologic incident. This example is further illustrated and discussed below in conjunction with process 400D in FIG. 4D.

Although four examples are identified and described in more detail below, other types of known signatures and incidents can be utilized to perform additional actions based on the monitored data.

For example, one or more smart sensor devices may utilize microphones that can detect a gunshot. Based on the known location of the smart sensor devices and the time at which the gunshot was recorded, an approximate location of the origin of the gunshot may be determined. In response, the smart sensor devices that captured to gunshot, or other smart sensor devices in the general area where the gunshot originated, can be instructed to capture additional camera images in an attempt to locate and identify the shooter or any possible victims.

As another example, the smart sensor devices may utilize air quality sensor to detect air-quality conditions (e.g., wildland fire smoke, smog, or other pollutants). By tracking these data across a plurality of smart sensor devices, the smart sensor devices may identify an origin of pollutants, the movement of pollutants, the distribution of pollutants, etc. This information can then be used to inform, warn, or alert the public of hazardous area or identify and fix the cause of the pollutants.

In yet another example, tilt or vibration data from a smart sensor device may indicate that at corresponding light pole has failed or is fatigued and may soon fail. The system can then take action by scheduling or initiating a technician to inspect the light pole and replace it if needed. This action may include automatically inputting a location of each fatigued or failed light pole into a navigation application of the technician. Such actions can be very helpful when it comes to responding to natural disasters. For example, after a hurricane hits an area, the smart sensor device data can be utilized to determine which light pole are down and which ones may need maintenance, which can be quicker and more efficient than a technician driving around to personally identify downed light poles.

These examples are not to be construed as limiting or exhaustive and other actions may be performed based on the type of incident identified from the monitored data.

If, at decision block 410, there is no match between the current data signature and a known signature, then process 400A flows from decision block 410 to block 416. At block 416, an output is provided to a user indicating that the data model signature is unknown. In various embodiments, this output may be via a graphical user interface, which enables the user to view or interact with the current data signature or the monitored data.

After block 414 or after block 416, process 400A terminates or otherwise returns to a calling process to perform other actions. Although not illustrated, process 400A may, in some embodiments, loop to block 402 to continue to receive additional monitored data from the smart sensor devices.

Although process 400A is primarily described as aggregating data from multiple smart sensor devices, embodiments are not so limited. In some embodiments, process 400A may be employed to aggregate data from a single smart sensor device.

Figure 4B:
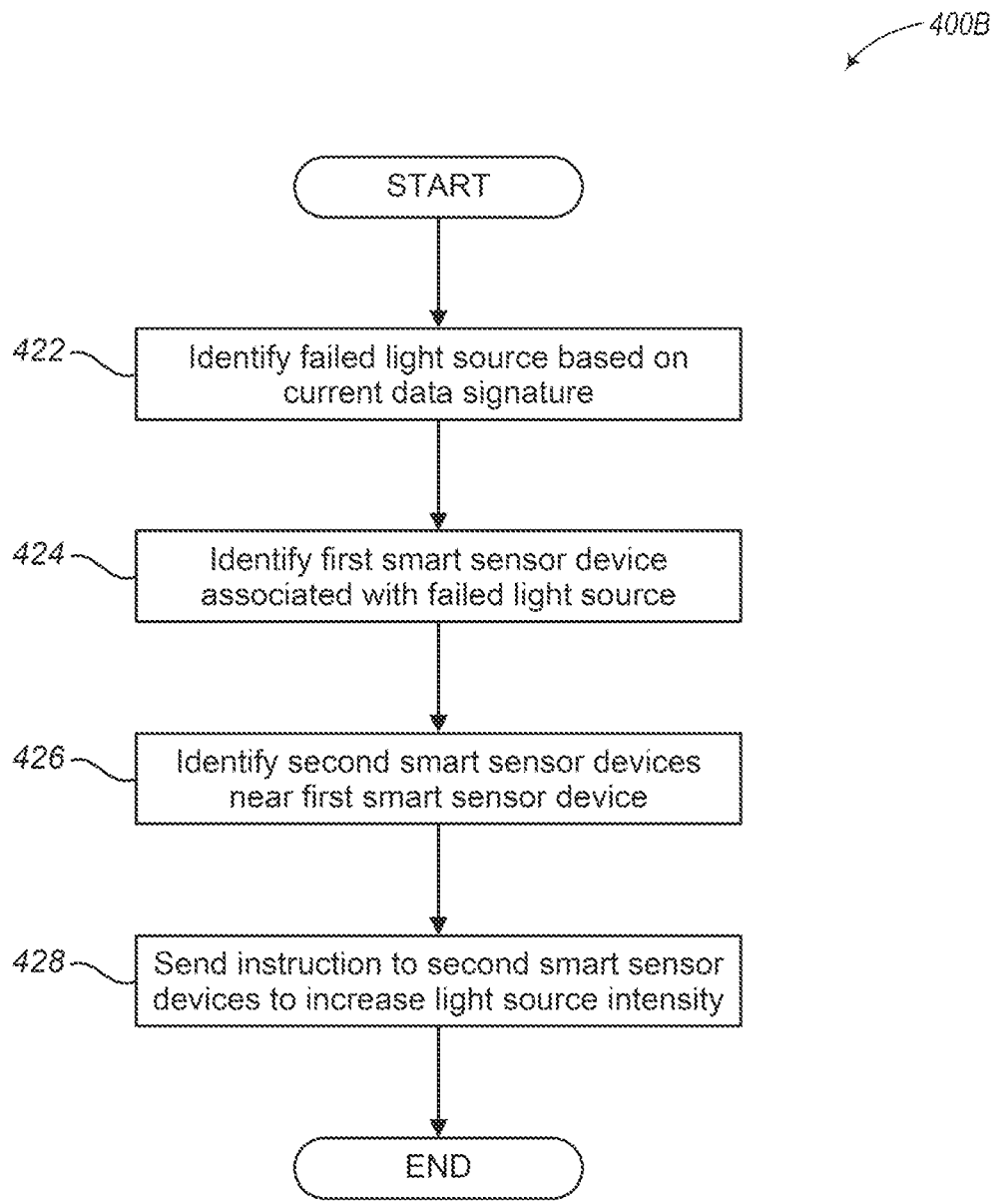

FIG. 4B is a logical flow diagram generally showing an embodiment of a process 400B for taking an action based on data model signature matching a known signature associated with a failed light source.

Process 400B begins after a start block. At block 422, a failed light source is identified based on the current data signature generated at block 406 in FIG. 4A and a known failed light source signature, which is determined at blocks 410 and 412 in FIG. 4A. The known signature of a failed light source may include, but is not limited to, a power consumption threshold, a temperature threshold, a feedback sensor, a light intensity threshold (e.g., if the light source should be illuminated but a light-intensity sensor is not detecting light sufficient to be an illuminated light source), etc.

Process 400B proceeds to block 424, where a first smart sensor device associated with the failed light source is identified. The first smart sensor device is the smart sensor device that is coupled to the streetlight fixture that includes the failed light source. In various embodiments, the first smart sensor device is the smart sensor device that captured data on the failed light source.

Process 400B continues at block 426, where one or more second smart sensor devices near the first smart sensor device are identified. In various embodiments, each smart sensor device includes a GPS unit that is used to determine a location of the corresponding smart sensor device. In other embodiments, an administrator or technician may input the location of each smart sensor device. Accordingly, the location of each device may be a geographic coordinate (e.g., longitude and latitude), a street address, a street name or section, a neighborhood, or some other location identifier.

The second smart sensor devices are identified as those smart sensor devices that are within a selected geographic characteristic associated with the first smart sensor device. For example, the second smart sensor devices may include the smart sensor devices that are within 100 meters of the first smart sensor device, are on a same street as the first smart sensor device, within a same block or neighborhood as the first smart sensor device, within a threshold number of streetlights or houses as the first smart sensor device, or within some other geolocation boundary.

Process 400B proceeds next to block 428, where an instruction is sent to each second smart sensor device to increase the intensity of the working light source of the correspondingly coupled streetlight fixture. To increase the intensity of a light source, the second smart sensors send one or more signals to the correspondingly coupled streetlight fixture to control a dimming feature of the light source in the streetlight fixture. In some embodiments, the amount in which to increase the intensity may be the same for each second smart sensor device or it may be different, such as depending on a distance the second smart sensor device is from the first smart sensor device. In this way, the second smart sensor devices closest to the first smart sensor device increase the intensity of their corresponding light sources more to compensate for the failed light source compared to second smart sensor devices that are farther away from the first smart sensor device.

After block 428, process 400B terminates or otherwise returns to a calling process to perform other actions.

Figure 4C:
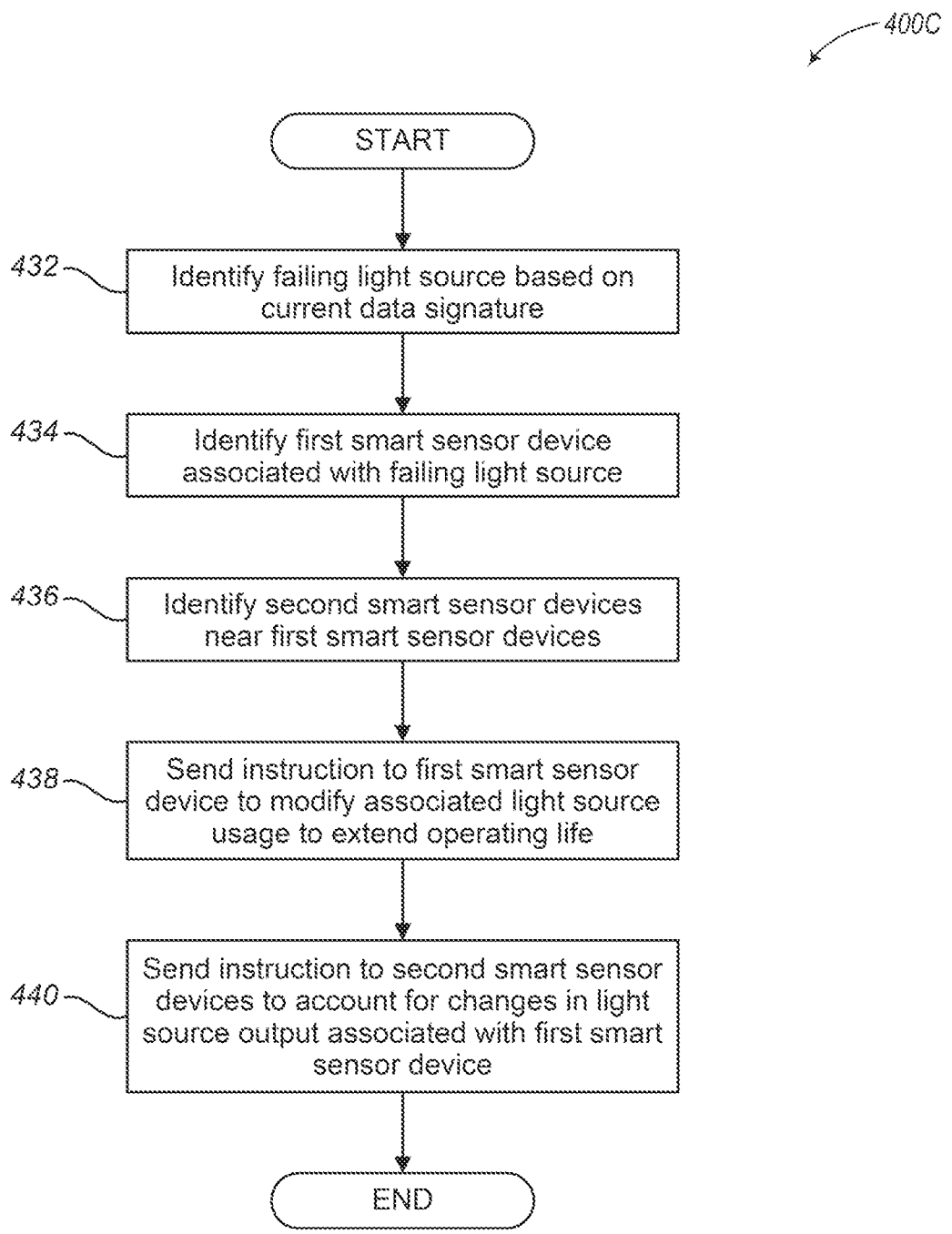

FIG. 4C is a logical flow diagram generally showing an embodiment of a process 400C for taking an action based on data model signature matching a known signature associated with a failing light source.

Process 400C begins after a start block. At block 432, a failing light source is identified based on the current data signature generated at block 406 in FIG. 4A and a known failing light source signature, which is determined at blocks 410 and 412 in FIG. 4A. The known signature of a failing light source may include, but is not limited to, a power consumption threshold or changes over time, temperature threshold or changes over time, a light intensity threshold or changes over time (e.g., if the intensity of the light source becomes diminished over time based on a sensor detecting the intensity of the light source), etc.

Process 400C proceeds to block 434, where a first smart sensor device associated with the failing light source is identified. The first smart sensor device is the smart sensor device that is coupled to the streetlight fixture that includes the failing light source. In various embodiments, the first smart sensor device is the smart sensor device that captured data on the failing light source.

Process 400C continues at block 436, where one or more second smart sensor devices near the first smart sensor device are identified. Similar to block 426 in FIG. 4B, the second smart sensor devices may be identified as those smart sensor devices that are within a selected geographic characteristic associated with the first smart sensor device. For example, the second smart sensor devices may include the smart sensor devices that are within 100 meters of the first smart sensor device, are on a same street as the first smart sensor device, within a same block or neighborhood as the first smart sensor device, within a threshold number of streetlights or houses as the first smart sensor device, or within some other geolocation boundary.

Process 400C proceeds next to block 438, where an instruction is sent to the first smart sensor device to modify usage of the light source of the correspondingly coupled streetlight fixture to extend the operating life of the light source. The first smart sensor device can modify the usage of the failing light source by reducing the intensity of the failing light source, delaying illumination of the failing light source at night, changing an ambient light threshold value to illuminate the failing light source to be later in the evening, turning off the failing light source prior to dawn or on select nights, or changing other characteristics of the failing light source or its streetlight fixture, or some combination thereof that seek to prolong the life of the failing light source.

Process 400C continues next at block 440, where an instruction is sent to each second smart sensor device to adjust usage of the working light source of the correspondingly coupled streetlight fixtures to account for the changes made by the first smart sensor device. The second smart sensor devices can adjust their corresponding light sources based on the adjustments by the first smart sensor device. For example, if the first smart sensor device dims the failing light source all night, then the second smart sensor devices can increase the intensity of their corresponding light sources all night to compensate for the failing light source. As another example, if the first smart sensor device delays illumination by one hour, then the second smart sensor devices can increase the intensity of their corresponding light sources for that hour but return to normal illumination when the failing light source is illuminated by the first smart sensor device.

Similar to block 428 in FIG. 4B, some second smart sensor devices may modify their light source usage the same or different than other second smart sensor devices, such as based on a distance the second smart sensor devices are away from the first smart sensor device.

By having the first smart sensor device reduce usage of the failing light source, the operating life of the failing light source might be extended. Moreover, the increase usage of the working light sources by the second smart sensor devices can compensate for the failing light source. Furthermore, if multiple light sources are starting to fail, the smart sensor devices can coordinate their usage to prolong the life of all light sources or to coordinate their failure. In this way, the municipality managing the streetlights can dispatch a technician to replace multiple light sources in one area at a given time and not just one at a time. In such embodiments, instructions are sent to each smart sensor device to modify usage of its corresponding light source based on the remaining operating life expectancy of that corresponding light source.

It should be noted that various different combinations of light source usage adjustments can be made by the first and second smart sensor devices to prolong the operating life of a failing light source, while maintaining suitable illuminate at street-level.

After block 440, process 400C terminates or otherwise returns to a calling process to perform other actions.

Figure 4D:
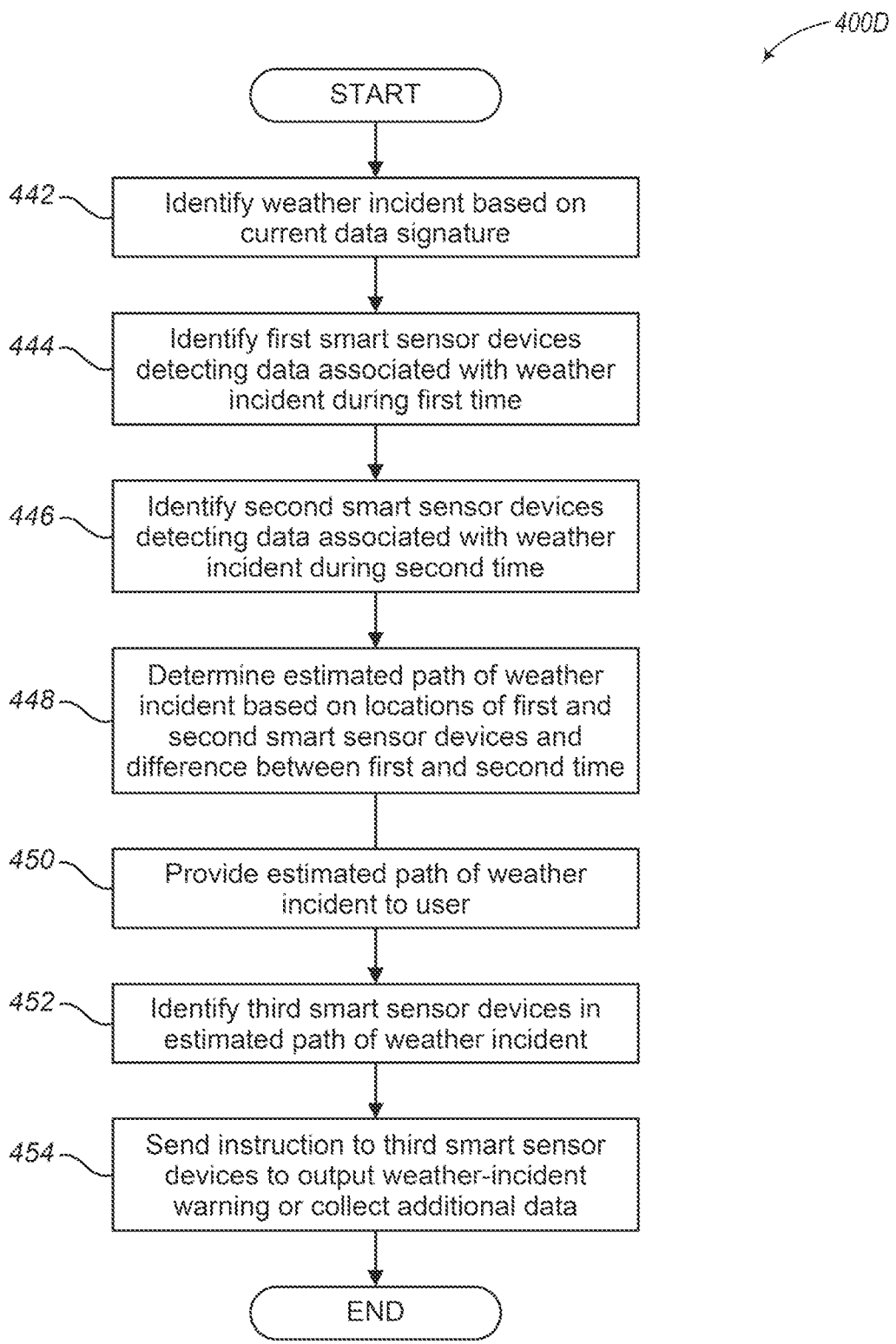

FIG. 4D is a logical flow diagram generally showing an embodiment of a process 400D for taking an action based on data model signature matching a known signature associated with a weather incident.

Process 400D begins after a start block. At block 442, a weather incident is identified based on the current data signature generated at block 406 in FIG. 4A and a known weather incident signature, which is determined at blocks 410 and 412 in FIG. 4A. As mentioned herein there may be a plurality of different types of weather incident and corresponding known weather incident signatures. For example, a hurricane signature may have a tilt value threshold and a moisture threshold, whereas a tornado signature may have a tilt values threshold (which may be the same or different than the tile value threshold for the hurricane signature), but no moisture threshold. In at least one embodiment, the identified weather incident includes at least one of a hurricane, a tornado, a flood, a monsoon, a cyclone, a blizzard, a hailstorm, a windstorm, or poor air quality. Embodiments, however, are not so limited and other types of weather incidents may also be identified.

Process 400D proceeds to block 444, where one or more first smart sensor devices associated with a weather incident are identified during a first time. The first smart sensor devices are the smart sensor devices that are coupled to the streetlight fixtures that are experiencing the weather incident. In various embodiments, the first smart sensor devices are the smart sensor devices that captured data used to identify the weather incident.

Process 400D continues at block 446, where one or more second smart sensor devices associated with the weather incident are identified during a second time that is after the first time. The second smart sensor devices are the smart sensor devices that are coupled to the streetlight fixture that are experiencing the weather incident at a time later than the first smart sensor devices. For example, if the weather incident is a hurricane and it is moving north, then the first smart sensor devices may be located a mile or two south of the second smart sensor devices such that the first smart sensor devices experience the hurricane before the second smart sensor devices as the hurricane proceeds north.

Process 400D proceeds next to block 448, where an estimated path of the weather incident is determined based on locations of the first and second smart sensor devices and a difference between the first and second time. The estimated path of the weather incident may include a general direction that the weather incident is moving, the speed at which it is moving, a general coverage or impact area, an anticipated future coverage or impact area, or the like.

As discussed above with respect to block 426 in FIG. 4B, the location of each smart sensor device may be obtained via GPS signals, user input, or the like. Thus, the location and distance between the first and second smart sensor devices can be used, along with the time between the first smart sensor devices collecting data on the weather incident and the second smart sensor devices collecting data on the weather incident, to determine the estimated path of the weather incident.

Process 400D continues next at block 450, where the estimated path of the weather incident is provided to a user. In various embodiments, a graphical user interface is provided to display the estimated path and other information regarding the weather incident to the user. In some embodiments, the graphical user interface may enable the user to interact with the estimate path and other information that is displayed.

Process 400D proceeds to block 452, where one or more third smart sensor devices are identified based on the estimated path of the weather incident. In at least one embodiment, the third smart sensor devices may be those smart sensor devices that are not currently experiencing the weather incident but are in a location that is within the estimated path of the weather incident.

Process 400D continues at block 454, where an instruction is sent to the third smart sensor devices to output a weather-incident warning or to collect additional data. In some embodiments, the instruction to the third smart sensor devices may be to output an audible warning about the incoming weather incident via speakers embedded in or attached to the third smart sensor device. In other embodiments, the instruction to the third smart sensor devices may be to output a visual warning about the incoming weather incident via the light source of the correspondingly coupled streetlight fixture, such as by having the light source blink at a selected frequency.

In various embodiments, the third smart sensor devices may be instructed to illuminate their corresponding light sources in a given pattern so as to show people an evacuation route away from the weather incident or to a safe location. Similarly, the first or second smart sensor devices may also be instructed to illuminate their corresponding light sources to provide warnings or show evacuation routes. Moreover, weather incident warnings or alerts may be provided to the user or to the public via other communication means, such as via mobile phone text messages.

After block 454, process 400D terminates or otherwise returns to a calling process to perform other actions.

As discussed throughout FIG. 4D, an estimated path of a weather incident is determined based on data received from smart sensor devices in different geographic locations. As a further illustration of this functionality, wind speed and direction can also be monitored across a neighborhood or over an entire city to determine a weather incident's progress. For example, every (or nearly every) streetlight fixture 102 on each light pole 106 can have thereon a smart sensor device 104 installed, as discussed herein. A tilt sensor inside or embedded in the smart sensor device 104 can be used to detect an angle of the correspondingly coupled light pole 106. The angle or change of angle over time can be normalized to an estimated wind speed that is experienced at the streetlight fixture 102. In some embodiments, the smart sensor device 104 may also include an external anemometer to measure the speed of the wind experienced by the streetlight fixture 102. The wind speed data captured from a plurality of smart sensor devices (e.g., anywhere from 5 devices to 10,000 devices or more) can be used to detect a high wind event, such as a hurricane, tornado, Nor'easter, or some other weather incident with wind speed that can cause harm to people or property.

The smart sensor devices 104 collect and monitor data, as described herein, as a weather incident begins and as it progresses. For example, as a hurricane comes ashore, a first string of smart sensor devices on streetlight fixtures on a street next to the shore can capture the wind speed and other data regarding the hurricane. This information, which can be combined with information obtained from additional smart sensor devices more inland as the hurricane moves ashore, can be used to predict the wind speed and path of the hurricane. The prediction can then be provided to a local weather station to distribute a warning via television, radio, or other communication means, to the public regarding the storms progress and predicted path. In this way, multiple highly accurate measurements of wind speed and direction can be taken from all over a city to determine where and how the hurricane is progressing, weakening, strengthening, changing course, etc. Similar monitoring and predicting techniques can be used to track tornados or other weather incidents and warn people of the incoming danger.

Figure 4E:
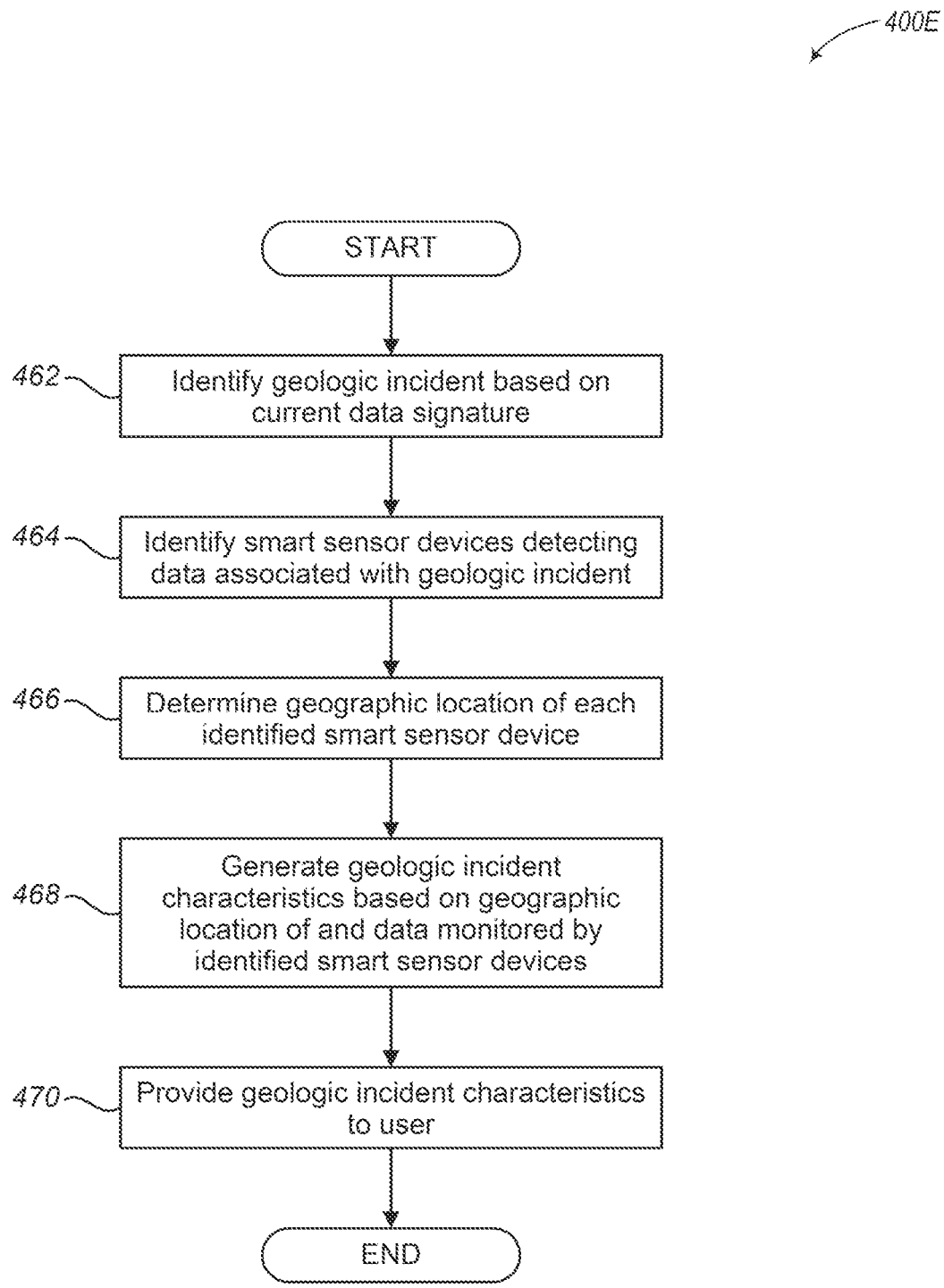

FIG. 4E is a logical flow diagram generally showing an embodiment of a process 400E for taking an action based on data model signature matching a known signature associated with a geologic incident.

Process 400E begins after a start block. At block 462, a geologic incident is identified based on the current data signature generated at block 406 in FIG. 4A and a known geologic incident signature, which is determined at blocks 410 and 412 in FIG. 4A. As mentioned herein there may be a plurality of different types of geologic incident and corresponding known geologic incident signatures. For example, an earthquake signature may have a specific vibration pattern, whereas a landslide may have a different specific vibration pattern followed by tilt values threshold for a minimum number of smart sensor devices in a given location. In at least one embodiment, the identified geologic incident includes at least one of an earthquake, volcanic activity, a lahar, or a landslide. Embodiments, however, are not so limited and other types of geologic incidents may also be identified.

Process 400E proceeds to block 464, where one or more smart sensor devices detecting the geologic incident are identified. The identified smart sensor devices are the smart sensor devices that are coupled to the streetlight fixtures that are experiencing the geologic incident. In various embodiments, the identified smart sensor devices are the smart sensor devices that captured data used to identify the geologic incident.

Process 400E continues at block 466, where a geographic location of each identified smart sensor devices is determined, which may be obtained via GPS signals or user input.

Process 400E proceeds next to block 468, where geologic incident characteristics are generated based on the geographic location of each identified smart sensor device and the data monitored by those smart sensor devices. In various embodiments, the data collected by the identified smart sensor devices is correlated with the locations of the smart sensor devices, which provides information as to how to geologic incident occurred and moved about the smart sensor devices.

Process 400E continues next at block 470, where the geologic incident characteristics of the geologic incident are provided to a user. In various embodiments, a graphical user interface is provided to display the geologic incident characteristics to the user. In some embodiments, the graphical user interface may enable the user to interact with the displayed geologic characteristics, such as to see how an earthquake spread through a city. In some embodiments, the identified smart sensors may also be instructed to output warnings or evacuation routes, similar to what is discussed above in block 454 in FIG. 4D. Moreover, geologic incident warnings or alerts may be provided to the user or to the public via other communication means, such as via mobile phone text messages.

After block 470, process 400E terminates or otherwise returns to a calling process to perform other actions.

Embodiments described herein can utilize any number of smart sensor devices (e.g., 5-10,000 smart sensor devices) to create a network of sensors across a city or some other geographic boundary. As discussed herein, information and data collected by the network of smart sensor devices can be used for various different purposes, from detecting one or more light sources that are out or failing to tracking weather or geologic incidents. The smart sensor device data can also be used for other purposes after a weather or geologic incident has ended.

For example, a report of the smart sensor device data from an incident can be provided to an insurance provider. The insurance provider can utilize the report to assess claims or to create incentives prior to a next incident. In one non-limiting example, the insurance provider may receive a claim for a damaged roof caused by a hurricane. The insurance provider can utilize data from the smart sensor devices installed in the streetlight fixtures next to or near the damaged roof to determine if that roof actually received winds that were high enough to damage the roof as claimed. If the wind speed capture by the nearby smart sensor device is insufficient, the insurance company can take additional actions to verify the claim.

Likewise, the smart sensor device data can be used to compare different claims against one another. For example, two houses on a same block can provide claims for the exact same roof damage. The data from multiple smart sensors on that block can be used to determine if both houses experienced the same wind speed or if they in fact experienced different wind speeds. If different wind speeds are detected, then the insurance company can take additional actions to verify the claims.

As another example, the smart sensor device data can be used to assess and compare failed structures with surviving structures. The smart sensor device data can be used to determine if the surviving structures received little or no damage because they did not experience the same wind speeds as the failed structures, or if both structures experienced the same wind speed, but the surviving structures received little or no damage because of other structural factors (e.g., shape of house or roof, types of materials, use of damage mitigating devices or procedures, etc.). This comparative information can then be used by the insurance provider to provide incentives to its customers. For example, if the smart sensor device data revealed that concrete fences reduce the amount of roof damage that a house sustains during a hurricane, then customers in hurricane-prone areas can be provided a discount in their premiums if the homeowner installs a concrete fence.

Again, the aggregation and comparison of smart sensor device data from a plurality of smart sensor devices distributed across a city can provide valuable information to warn people about various types of incidents, as well as to reduce or prevent damage from future incidents.

Figure 4F:
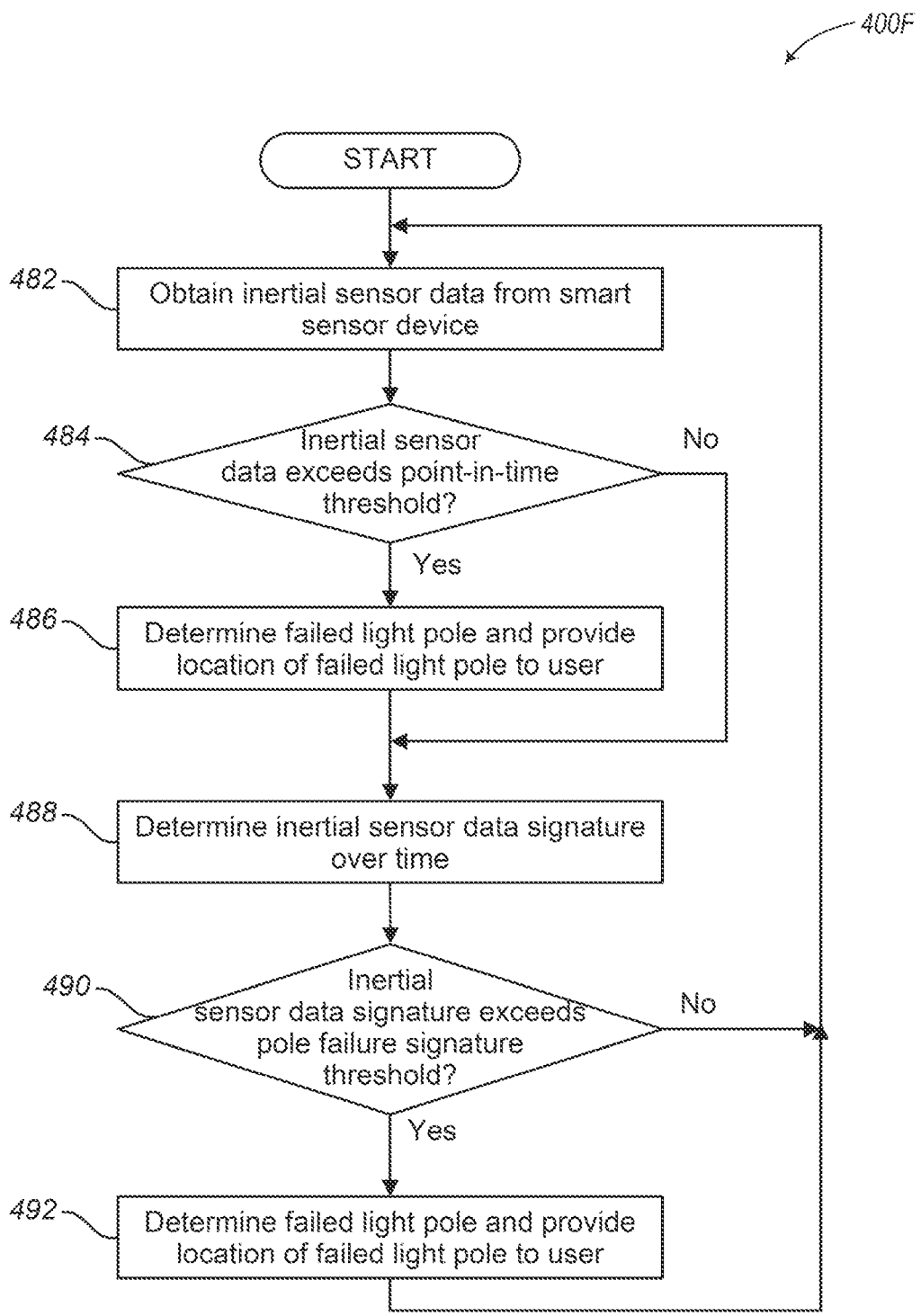

FIG. 4F is a logical flow diagram generally showing an embodiment of a process 400F for taking an action based on an inertial sensor data signature matching a known signature associated with a failed or failing light pole.

Process 400F begins after a start block. At block 482, inertial sensor data is obtained from a smart sensor device. The inertial sensor data may include accelerometer data, gyroscope data, or other movement-related data. For example, in some embodiments, the inertial sensor data includes tilt angle and vibration information. As discussed herein the smart sensor device may send the inertial sensor data to a remote server computer periodically or at selected times or upon request.

Process 400F proceeds to block 484, where a determination is made whether the inertial sensor data exceeds a point-in-time threshold. In various embodiments, the point-in-time threshold may include a single data point threshold value (contrasted with a minimum, maximum, average, or standard deviation threshold for sensor data collected for a period of time). In this way, the inertial sensor data is utilized to make real time determinations regarding the status of the light pole.

In some embodiments, one or more types of inertial sensor data are compared against one or more threshold values. For example, tilt angle may be compared against a tilt threshold angle. If the tilt angle exceeds the tilt threshold angle, then it may be determined that an incident has occurred resulting in the light pole being bent over or broken, such as a car running into the light pole or hurricane winds toppling the light pole. In some embodiments, when a single type of inertial sensor data exceeds a threshold value, a signal may be generated to indicate that the inertial sensor data has exceeded the point-in-time threshold. In other embodiments, the point-in-time threshold is exceeded when a combination of multiple types of inertial sensor data each exceeds its respective threshold value.

If the inertial sensor data exceeds the point-in-time threshold, then process 400F flows to block 486; otherwise, process 400F flows to block 488.

At block 486, the light pole associated with the smart sensor device that provided the inertial sensor data is identified as a failed light pole. The location of the failed light pole may be determined from GPS data from the smart sensor device and provided to a user. In some embodiments, other information associated with the failed light pole may also be provided to the user. For example, in some embodiments, a portion or all of the inertial sensor data (e.g., the tilt angle) may be provided to the user. In other embodiments, a damage estimate for the failed light pole may be provided to the user. For example, if the tilt angle exceeds one threshold value but not a second threshold value, then the user may be informed that the light pole is only leaning and may need to be up-righted. But if the tilt angle exceeds the second threshold value, then the user may be informed that the light pole may be broken or on the ground and may need to be replaced.

After block 486, or if the inertial sensor data does not exceed the point-in-time threshold, process 400F proceeds to block 488. At block 488 an inertial sensor data signature for a period of time is determined. This collection of inertial sensor data enables the status or failure of the light pole to be monitored or determined over time.

In some embodiments, the inertial sensor data signature may be an average, minimum, maximum, standard deviation, or other statistical value of inertial sensor data from one or more inertial sensors for a select period of time. In other embodiments, the inertial sensor data signature may be a pattern. For example, the inertial sensor data signature may indicate a first vibration level for a given amount of time followed by a particular tilt angle, which is subsequently followed by a second vibration level that is greater than the first vibration level. These example inertial sensor data signatures are for illustrative purposes and other inertial sensor data signatures may be employed.

Process 400F continues at decision block 490, where a determination is made whether the inertial sensor data signature exceeds a pole failure signature threshold. In various embodiments, the inertial sensor data signature is compared to a plurality of known pole failure signatures. The known signatures are patterns, thresholds, trends, tendencies, values, or other models or collections of information that are representative of a pole failure. The plurality of known signatures may be generated by an administrator, a manufacturer (e.g., the manufacturer or the light pole), based on historical data and failures (e.g., through the use of machine learning on historical field data or lab tests), etc.

In various embodiments, the known pole failure signatures may be specific to the type of light pole associated with the smart sensor device. For example, a wood light pole generally has a different amount of acceptable sway compared to a steel light pole. Similarly, different mounting hardware between the light pole and the ground may be taken into account for the known pole failure signatures.

If the inertial sensor data signature exceeds a pole failure signature threshold, then process 400F flows to block 492; otherwise, process 400F loops to block 482 to continue to obtain additional inertial sensor data.

At block 492, the light pole associated with the smart sensor device that provided the inertial sensor data is identified as a failed light pole. The location of the failed light pole may be determined from GPS data from the smart sensor device and provided to a user, similar to what is described above at block 486.

Although process 400F is described with respect to a failed light pole, process 400F may also be employed to determine structural failures in the light fixture itself. For example, if the light fixture mounting hardware fails, the light fixture may fall off of the light pole. In this instance, the tilt sensor data may exceed a threshold value (e.g., because the light fixture is upside down) indicating that there is a failure in the light fixture, even though the light pole itself is still standing. Accordingly, process 400F may be employed to detect failures in the light pole, failures in the ground-to-light pole mounting hardware, failures in the light fixture-to-light pole mounting hardware, or some combination thereof.

Figure 5:
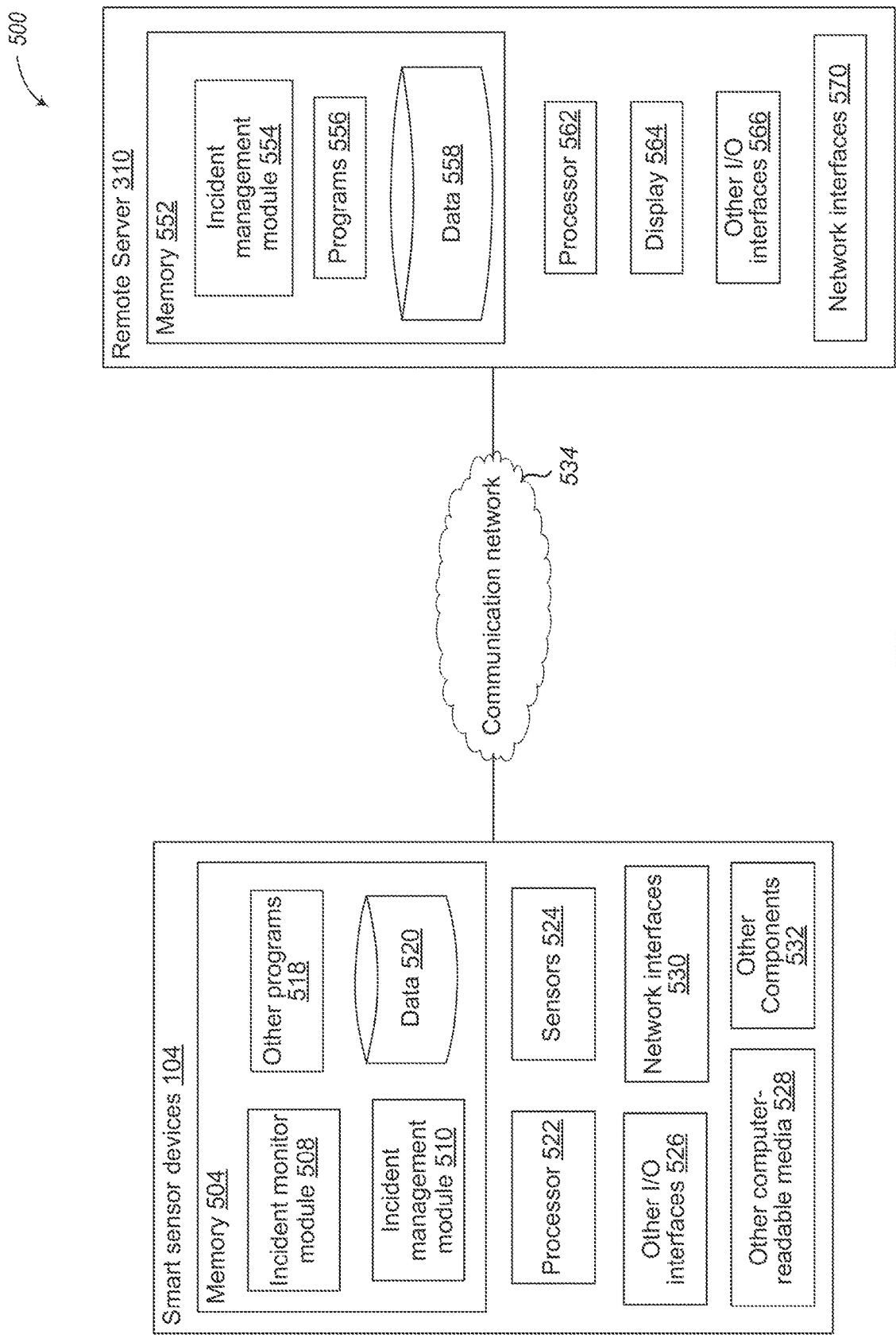
FIG. 5 shows a system diagram that describes one implementation of computing systems for implementing embodiments described herein.

FIG. 5 shows a system diagram that describes one implementation of computing systems for implementing embodiments described herein. System 500 includes smart sensor devices 104 and remote server 310.

As described herein, smart sensor devices 104 are computing devices that can perform functionality described herein for monitoring sensors and collecting data. In some embodiments, smart sensor devices 104 model and manage failures associated with streetlight fixtures 102, as described herein. One or more special-purpose computing systems may be used to implement a smart sensor device 104. Accordingly, various embodiments described herein may be implemented in software, hardware, firmware, or in some combination thereof. Each smart sensor device 104 includes memory 504, one or more processors 522, sensors 524, input/output (I/O) interfaces 526, other computer-readable media 528, network interface 530, and other components 532.

Processor 522 includes one or more processing devices that execute computer instructions to perform actions, including at least some embodiments described herein, such as processes 400A-400E in FIGS. 4A-4E, respectively. In various embodiments, the processor 522 may include one or more central processing units (CPUs), programmable logic, or other processing circuitry.

Memory 504 may include one or more various types of non-volatile and/or volatile storage technologies. Examples of memory 504 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 504 may be utilized to store information, including computer-readable instructions that are utilized by processor 522 to perform actions, including at least some embodiments described herein.

Memory 504 may have stored thereon various modules, such as incident monitor module 508 and incident management module 510. The incident monitor module 508 provides functionality to monitor sensors or conditions of the smart sensor device 104 to capture and store data, as described herein. The incident management module 510 provides functionality to model and manage failures and other incidents associated with streetlight fixtures 102 based on the data captured and stored by the incident monitor module 508, as described herein.

Memory 504 stores data 520, which may include a plurality of different sensor data, smart sensor device conditions or characteristics, or other information obtained by the smart sensor device 104. The data 520 may also include one or more known signatures for various types of streetlight fixture modeling and management, such as, but not limited to, failed light source signatures, failing light source signatures, weather incident signatures, geologic incident signatures, etc. The memory 504 may also store other programs 518, which may include operating systems, user applications, or other computer programs.

Sensors 524 include one or more sensors in which the smart sensor device 104 can monitor and obtain data. Examples of sensors 524 include, but are not limited to, tilt sensors, accelerometers, temperature sensors, power metering sensors, cameras, microphones, humidity sensors, rain collection sensors, wind sensors, or other sensors that can provide information about the smart sensor device itself, the streetlight fixture 104 in which the smart sensor device is couple, the light pole that the corresponding streetlight fixture 104 is coupled, or the environment surrounding the smart sensor device 104 and the corresponding streetlight fixture 102 and light pole 106. The sensors 524 may be included, incorporated, or embedded into the smart sensor device 104, as illustrated, or one or more of the sensors 524 may be distinct and separate from the smart sensor device 104.

I/O interfaces 526 may include interfaces for various other input or output devices, such as audio interfaces, other video interfaces, USB interfaces, physical buttons, keyboards, or the like. In some embodiments, the I/O interfaces 526 provide functionality for the smart sensor device 104 to communicate with the sensors 524.

Other computer-readable media 528 may include other types of stationary or removable computer-readable media, such as removable flash drives, external hard drives, or the like.

Network interfaces 530 are configured to communicate with other computing devices, such as the remote server 310, via a communication network 534. Network interfaces 530 include transmitters and receivers (not illustrated) to send and receive data as described herein. The communication network 534 may include the communication network 312 of FIG. 3.

The remote server 310 is computing device that is remote from the smart sensor devices 104. The remote server 310 receives data from a plurality of smart sensors 104 and generates models and manages failures and other incidents associated with streetlight fixtures 102 based on the data obtained from the smart sensor devices 104. One or more special-purpose computing systems may be used to implement the remote server 310. Accordingly, various embodiments described herein may be implemented in software, hardware, firmware, or in some combination thereof.

The remote server 310 includes memory 552, one or more processors 562, I/O interfaces 566, and network interface 570, which may be similar to or incorporate embodiments of memory 504, processor 522, I/O interfaces 526 and network interface 570 of smart sensor devices 104, respectively. Thus, processor 562 includes one or more processing devices that execute computer instructions to perform actions, including at least some embodiments described herein. In various embodiments, the processor 522 may include one or more central processing units (CPUs), programmable logic, or other processing circuitry. Memory 552 may include one or more various types of non-volatile and/or volatile storage technologies. Memory 552 may be utilized to store information, including computer-readable instructions that are utilized by processor 562 to perform actions, including at least some embodiments described herein, such as processes 400A-400E in FIGS. 4A-4E. Memory 552 may also store incident management module 554, programs 556 and data 558. The management module 554 may perform functionality similar to the incident monitor module 508 of the smart sensor devices 104. The data 558 may include data received from a plurality of smart sensor devices 104 as well as known data signatures, similar to data 520. The display 564 is a display device capable of rendering content, data, or information to a user. In various embodiments, the incident management module 554 presents a user interface to a user via the display 524. Such a user interface may include data received from a plurality of smart sensor devices, identified incidences and the corresponding smart sensor device data, setting in which the user can select which sensors the smart sensor devices are to monitor, etc. The display 562 may be a liquid crystal display, light emitting diode, or other type of display device, and may include a touch sensitive screen capable of receiving inputs from a user's hand, stylus, or other object.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., recording and reporting the collection of utility grade power metering data, recording and reporting IoT data, crowd control data, anomalous action data, and the like). An example of an activity that is not real-time is one that occurs over an extended period of time (e.g., hours or days)] or that occurs based on intervention or direction by a person or other activity.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses, or sentences such that the thing following the comma is also included in the list.

As described herein, for simplicity, a user is in some case described in the context of the male gender. For example, the terms "his," "him," and the like may be used. It is understood that a user can be of any gender, and the terms "he," "his," and the like as used herein are to be interpreted broadly inclusive of all known gender definitions.

As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The various embodiments described above can be combined to provide further embodiments. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

What is claimed is:

1. A system comprising:
a plurality of smart sensor devices, wherein each smart sensor device is coupled to a respective streetlight fixture of a plurality of streetlight fixtures and includes:
 a processor-based monitoring circuit arranged to receive data captured by one or more sensors, the one or more sensors monitoring conditions associated with the respective streetlight fixture; and
 memory arranged to store the received data to produce stored sensor data; and
a computing device that includes:
 memory arranged to store data received from the plurality of smart sensor devices to produce stored sensor device data; and
 a processor arranged to execute computer instructions that cause the processor to:
  aggregate the stored sensor device data to produce aggregated data;
  generate a data signature from the aggregated data;
  compare the data signature to a plurality of stored data signatures;
  identify a failing light source in a first streetlight fixture of the plurality of streetlight fixtures based on the comparison,
  wherein a first smart sensor device is coupled to the first streetlight fixture; and
  instruct the first smart sensor device to delay illumination of the failing light source to reduce an amount of time during which the failing light source is illuminated at night.

2. The system of claim 1, wherein instruction of the first smart sensor device includes instruction to decrease a threshold amount of light to be detected to illuminate the failing light source.

3. The system of claim 1, wherein the computing device is one of the plurality of smart sensor devices.

4. The system of claim 1, wherein execution of the computer instructions further causes the processor to:
compare a data signature of the first smart sensor device to a light pole fatigue signature, wherein the first streetlight fixture is coupled to a first streetlight pole;
generate an estimated failure time of the first streetlight pole due to light pole fatigue; and
provide the estimated failure time to a user.

5. The system of claim 1, wherein each streetlight fixture of the plurality of streetlight fixtures is coupled to a respective streetlight pole of a plurality of streetlight poles, and wherein the processor-based monitoring circuit of each smart sensor device further monitors conditions associated with the respective streetlight pole to which the respective streetlight fixture is coupled.

6. A method performed by a processor of a computing device, the method comprising:
receiving sensor data from a plurality of smart sensor devices, each smart sensor device being coupled to a respective streetlight fixture of a plurality of streetlight fixtures;
aggregating the received sensor data to produce aggregated data;
generating a data signature from the aggregated data;
comparing the data signature to a plurality of stored data signatures;
identifying a failing light source in a first streetlight fixture of the plurality of streetlight fixtures based on the comparison, wherein a first smart sensor device is coupled to the first streetlight fixture; and
instructing the first smart sensor device to delay illumination of the failing light source to reduce an amount of time during which the failing light source is illuminated at night.

7. The method of claim 6, wherein instructing the first smart sensor device includes:
instructing the first smart sensor device to decrease a threshold amount of light to be detected to illuminate the failing light source.

8. The method of claim 6, wherein the computing device is one of the plurality of smart sensor devices.

9. The method of claim 6, further comprising:
comparing a data signature of the first smart sensor device to a light pole fatigue signature, wherein the first streetlight fixture is coupled to a first streetlight pole;
generating an estimated failure time of the first streetlight pole due to light pole fatigue; and
providing the estimated failure time to a user.

10. A smart sensor device attachable to a streetlight fixture that is coupled to a streetlight pole, the smart sensor device comprising:
memory arranged to store computing instructions and data;
one or more sensors monitoring conditions associated with the respective streetlight fixture and generating data responsive thereto; and
a processor arranged to execute the computing instructions to:
receive the data from the one or more sensors;
store the received data in the memory;
aggregate the stored data over a period of time to produce aggregated data;
generate a data signature from the aggregated data;
compare the data signature to a plurality of stored data signatures, each stored data signature being associated with a respective type of incident;
identify a failing light source in the streetlight fixture based on the comparison; and
delay illumination of the failing light source to reduce an amount of time during which the failing light source is illuminated at night.

11. The smart sensor device of claim 10, wherein execution of the computer instructions further causes the processor to:
send an instruction to a second smart sensor device that is coupled to a second streetlight fixture, the second streetlight fixtured being located near the streetlight fixture, the instruction instructing the second smart sensor device to increase an intensity of a light source in the second streetlight fixture.

12. The smart sensor device of claim 10, wherein execution of the computer instructions further causes the processor to reduce an intensity of the failing light source.

13. The smart sensor device of claim 10, wherein the one or more sensors further monitor conditions associated with the streetlight pole, and wherein execution of the computer instructions further causes the processor to:
compare the aggregated data to a light pole fatigue signature;
determine an estimated failure time of the streetlight pole when the aggregated data corresponds to the light pole fatigue signature; and
provide a light pole failure warning to a user based on the estimated failure time.

* * * * *